United States Patent
Zhang et al.

(10) Patent No.: US 10,394,811 B2
(45) Date of Patent: Aug. 27, 2019

(54) TAIL-BASED TOP-N QUERY EVALUATION

(71) Applicant: Oracle International Corporation, Redwood Shores, CA (US)

(72) Inventors: Gong Zhang, Belmont, CA (US); Venkatraman Govindaraju, Fremont, CA (US); Sam Idicula, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 184 days.

(21) Appl. No.: 15/608,830

(22) Filed: May 30, 2017

(65) Prior Publication Data
US 2018/0349439 A1     Dec. 6, 2018

(51) Int. Cl.
*G06F 17/00*      (2019.01)
*G06F 16/2453*    (2019.01)
*G06F 16/2455*    (2019.01)
*G06F 16/2457*    (2019.01)

(52) U.S. Cl.
CPC .. *G06F 16/24532* (2019.01); *G06F 16/24542* (2019.01); *G06F 16/24561* (2019.01); *G06F 16/24578* (2019.01)

(58) Field of Classification Search
CPC ........ G06F 16/951; G06F 21/64; G06F 16/27; G06F 21/53; G06F 16/2228; G06F 16/9024
See application file for complete search history.

(56) References Cited

PUBLICATIONS

S. Rajasekaran, "Selection Algorithms for Parallel Disk Systems", Journal of Parallel and Ditributed Computing, vol. 61, No. 4, pp. 536-544, 2001, 8 pages.
P. Tsigas et al. "A Simple, Fast Parallel Implementation of Quicksort and its Performance Evaluation on SUN Enterprise 10000" Eleventh Euromicro Conference on Parallel, dated 2003, pp. 372-381.
P. Boncz, M.Zukowski, and N. Nes. "MonetDB/X100: Hyperpipelining Query Execution", In Proc. CIDR, Asilomar, CA,USA, 2005, 13 pages.

(Continued)

*Primary Examiner* — Truong V Vo
(74) *Attorney, Agent, or Firm* — Hickman Palermo Becker Bingham LLP

(57) ABSTRACT

Techniques are described for executing a query with a top-N clause to select a first N-number of rows in a data source arranged at least according to a first key and a second key of the data source using a first sort order respectively specified for the first key and a second sort order respectively specified for the second key by the query. The data source may include one or more tiles that include at least a portion of the first key and the second key. To execute the query, in an embodiment, a DBMS determines, in a first vector of first key values that are in a first tile, row identifiers identifying entries of the first vector that contain values equal to a tail value that follows a particular top number of the first key values. The DBMS may select, from a second vector of values of the second key in the first tile, second key values identified based on the determined row identifiers of the first vector. In an embodiment, the DBMS generates a result set of the query that includes at least a value from the second key values selected from the second vector based on the determined first row identifiers.

25 Claims, 19 Drawing Sheets

(56) References Cited

PUBLICATIONS

M.Zukowski. "Balancing Vectorized Query Execution with Bandwidth-Optimized Storage", PhD thesis, CWI Amsterdam, 2009, 244 pages.

M. Blum, R. W. Floyd, V. Pratt, R. L. Rivest, and R. E. Tarjan, "Time bounds for selection", Journal of Computer and System Sciences 7(4) (1973), 448-461.

J. Sompolski, M.Zukowski, P. Boncz, Vectorization vs Compilation in Query Execution. In Prof. DaMoN 2011, Athens, Greece, 2011, 8 pages.

Floyd, R.W.; Rivest, R. L. (Mar. 1975). "Expected time bounds for selection". Communications of the ACM 18 (3): pp. 165-172.doi:10.1145/360680.360691.

David Bader, "An improved, randomized algorithm for parallel selection with an experimental study," J. Parallel and Distributed Computing 64, 9 (2004), 1051-1059.

A. Fujiwara et al. "Parallel Selection Algorithms with Analysis on Clusters" Proceedings of Fourth International Symposium on Parallel Architectures, Algorithms, and Networks , dated 1999, pp. 388-393.

TAIL-BASED TOP-N QUERY EVALUATION

FIELD OF THE INVENTION

The present invention relates generally to database management systems and more particularly, tail-based top-N query evaluation by database management systems.

BACKGROUND

Executing analytical queries on large amounts of data (colloquially known as "big data") poses a great challenge for database management systems (DBMS). Conventional methods generally require data for analytical queries to be loaded into operational memory from persistent memory to be processed. With data for a single query execution reaching large scales of terra bytes, the operational memory may not be able to hold the full data source required for the query execution. In such a scenario, the spill over data may extend into slower memory that has higher storage capacity but much slower input/output (I/O) speed. In addition to slower I/O, more complex operations such as a sort or aggregation performed on big data may further exacerbate the draw on the computational resources of the DBMS. Particularly, comparing and re-arranging terra bytes of data spread across slower memory would substantially decrease the performance of the query and affect the user experience.

The challenge is particularly evident with top-N analytical queries. The term "top-N" query refers to analytical queries that select and sort a data source from a DBMS and output only the first N (top-N) number of rows of the sorted data as the result. The DBMS loads the target data source of a top-N query into a buffer, sorts the buffer according to one or more columns and respective orders specified in the top-N query, and selects the top-N rows. The one or more columns that are specified for the sort of a top-N query data source are referred herein as "keys." When multiple keys are specified, then whichever key is specified first is used for the sorting of rows. The next key is used to sort rows which have the same values for the earlier specified key and so forth.

When the top-N query is executed on a table with big data, all rows from the big data table may be loaded into a buffer. The buffer, which at that point may span over multiple types of memory and may include slower memories like disk memory, may contain millions of rows that have to be sorted. Sorting so many rows consumes enormous amounts of resources of the DBMS and causes over utilization of computational resources, while the use of slower memory introduces substantial latency in the processing.

To handle the challenge, new functionalities have been developed for computer hardware to process big data. For example, today's computing nodes usually utilize multiple multi-core processors, in which each multi-core processor consists of multiple independent processing units to execute instructions in parallel manner. However, the multi-core architecture requires new techniques to fully leverage the inherent parallelism in the hardware.

Furthermore, modern computer architecture includes multiple types of memory having different speed and storage capacity, with higher speed memory having lower storage capacity. For example, data operations on cache memory are magnitudes faster than the data operations on disk memory, while the capacity of the disk memory is generally many magnitudes more than the cache memory. Therefore, it is critical for the new techniques to ensure that the data operations are performed on a smaller data that can fit into higher speed lower storage capacity memory.

Not only smaller data chunks are preferred for the multi-node/core hardware, but also processing that is based on columns rather than individual tuples is desirable. In the traditional row-based pipeline model, in which a whole row or full tuple is read into memory to process, significant computing resources are spent on query plan evaluation rather than on the processing of data itself. Furthermore, the row-based query execution usually incurs a high cache miss rate, and significant interpretation overheads because the tuples generally carry the full row data, which occupies greater memory space and incurs greater cost in extracting the necessary data from the tuple.

With the columnar vectorized execution model, as opposed to row-based execution model, query data source is processed column by column instead of a full row by full row. In such a model, the input to a query operator is a column (or a portion thereof), which is a single dimensional array, also referred herein as a vector. Compared with the traditional tuple-at-a-time model, columnar vectorized execution model significantly improves the query execution performance because many performance-critical optimizations such as loop-unrolling can be applied. Modern CPUs also have specific column-optimized features such as Single Instruction, Multiple Data (SIMD) instructions that optimally use cache hierarchy reducing the interpretation overheads.

However, vectorized execution imposes further challenges on a top-N query execution. For example, after processing one vector for a top-N selection, the result is intermediate because other vectors of the same key are to be processed. Thus, the result needs to be preserved from one vector processing to the next vector processing. The techniques need to insure that the result is small enough to be transferred between computing nodes/cores and be preserved in cache without being pushed out to a lower-level memory.

Another distinct challenge with a top-N query execution in a vectorized execution environment arises when the top-N query specifies multiple keys for sorting to select top-N rows. Because, in the columnar vectorized execution environment, the data is processed in column-wise manner, only a single vector of only a single key is processed at a time. Such processing introduces difficulty in comparing two key values which are equal on the same key. The next key specified by the query has to be used to differentiate them further. However, interrupting the current vector processing to fetch the next key vector incurs prohibitive overheads and thus, should be avoided.

BRIEF DESCRIPTION OF THE DRAWINGS

In the drawings of certain embodiments in which like reference numerals refer to corresponding parts throughout the figures.

DETAILED DESCRIPTION

Figure 1:
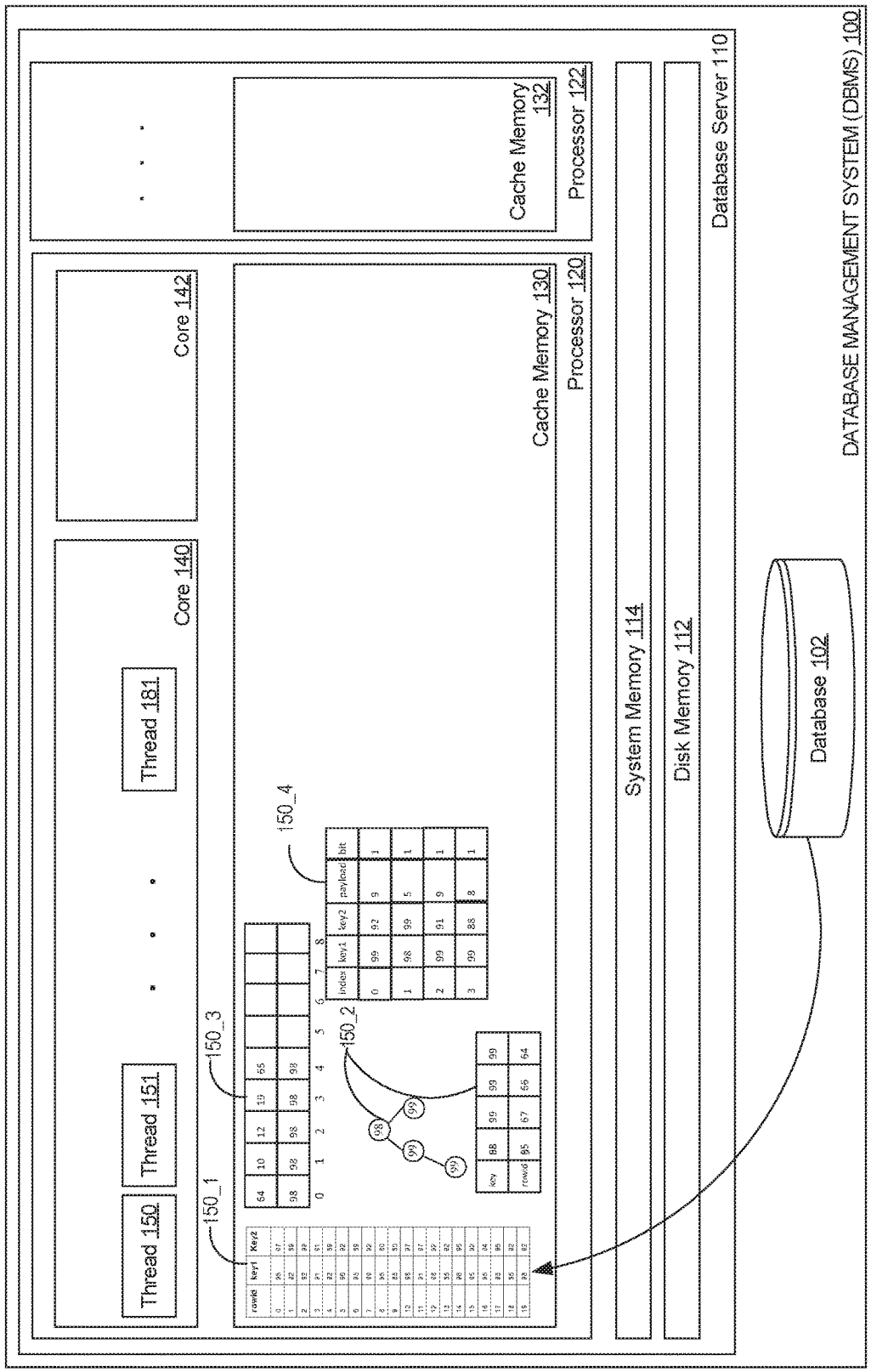
FIG. 1 is a block diagram that depicts a database management system (DBMS) that executes a top-N query, in an embodiment.

In the following description, for the purposes of explanation, numerous specific details are set forth in order to provide a thorough understanding of the present approach. It will be apparent, however, that the present approach may be practiced without these specific details. In other instances, structures and devices are shown in block diagram form in order to avoid unnecessarily obscuring the present approach.

General Overview

In an embodiment, a top-N query is evaluated in parallel by multiple processing units, each evaluating a chunk of a data source targeted by the top-N query. A chunk of a data source, even when vectorized, may still be of a significant size, so much so as to exceed the size of available memory of the processing unit to which the chunk is assigned for evaluating a top-N query. Thus, loading the portion into the memory of the processing unit may cause lower level memories to be utilized, in which case constant swapping will degrade the execution of the top-N query.

In an embodiment, to improve the performance of top-N query execution, a processing unit may load and process a data source a "tile at a time. A tile is a portion of the data source chunk to which the processing unit is assigned and includes one or more vectors of key values for respective keys specified in a top-N query. Each key vector contains entries with key values from a portion of the data source chunk assigned to the processing unit. Entries of key vectors of the tile from the same row of the data source may have the same index value, identified with unique row identifiers.

To evaluate top-N query that uses multiple sort keys, a "tail data structure" is utilized. The term "tail data structure" refers to a data structure that stores row information, such as row identifiers, of one or more key values that are equal to a "tail value". In an evaluation of key values to determine a top number of key values, the "tail value" term refers to the last value of at least particular top number of key values arranged using a sort order specified for the key in a received top-N query. For example, for evaluating a top-N query indicating a descending sort order on a specified key, a processing unit may scan the specified key in a tile, while maintaining at least a top-N (N-number of greatest) key values as each key value is scanned. At any point in such a set of top-N greatest values, the minimum value is designated as the tail value, and the tail data structure may store the row identifiers of the specified key values that are equal to the tail value at any point of evaluation.

In an embodiment, a tail data structure generated from the previous key vector evaluation is used in evaluation of the next key vector. Rather than scanning each and every entry in the next key vector, a processing unit retrieves only those entries that have been identified in the previous tail data structure, saving computing resources and improving the processing of the top-N query.

In an embodiment, a processing unit maintains a tail data structures that stores zero or more row identifiers for rows that contain the tail values of top-N values of a key. The tail data structure may be empty if no other key value is scanned that is equal to the current tail value. When a key value is scanned from the first key (the first specified key in the sort specification of the top-N query), a processing unit determines whether the new key value is equal to the tail value of the current top-N key values scanned. If so, then the processing unit stores the row identifier of the new key value in the tail data structure of the first key (first tail data structure). At the end of the scan of the first key, if the number of top-N values is greater than N because multiple key values are equal to the final tail value, then the next key may be evaluated using the first tail data structure that identifies one or more rows to scan in the next key vector. If there are no more key vectors to evaluate, then one or more rows are selected from the first tail data structure to generate the top-N result set of N results.

In one embodiment, when processing the next key vector, the processing unit similarly maintains a tail data structure for the next key. If, after the processing of the next vector, the tail data structure is not empty, a subsequent key vector, if any, may be similarly processed.

In an embodiment in which another key (third and subsequent key) is specified by the top-N query, if the values of the next key have multiple tail values that together with the first key top-N values exceed the N-number of values, the processing unit creates another tail data structure and repeats the above-described process for the next key.

In an embodiment, in which after all keys are processed the tail data structure, and the top-N values from processed keys together with the last tail data structure exceed the N number of values, the remaining rows for the top-N query are selected arbitrary from the last tail data structure.

When a processing unit evaluates its allocated a chunk in a manner of one tile at a time, the processing unit maintains the results of the processing of a top-N query from the last tile and uses the results in the processing of the new tile, in an embodiment. The processing unit may initialize data structures for processing the next tile with the result set of the previous tile, thus the previous tile results are reconciled with the next tile results, while the next tile is evaluated. Such parallel reconciliation while processing the next tile also improves the processing of the top-N query by saving computing resources necessary to reconcile the result sets.

For example, the processing unit may generate and maintain an array of status values describing the validity of each row in top-N result set from the previous tile. As the next tile is processed by the processing unit, if any row value from the previous top-N result set is determined not to be within the top-N values, then the processing unit set the validity of the status for that row in the result set to invalid. The status may be changed back to valid if, for example, when processing the next key of the next tile, it is determined that the entry of the result set is indeed within the top-N values.

To differentiate between the top-N result set of the previous tile, the processing unit maintains a row index that is different from the row index of the top-N result set being determined in the current tile, in an embodiment. For example, the previous tile row indices are incremented by an offset. To avoid collision of indices of the current tile and the previous tile rows, the next, the offset may be at least equal to the number of rows selected for each tile (the length of key vector of each tile).

Additionally, the processing units are processing a chunk of a data source in parallel to create each of the top-N data stores substantially simultaneously, speeding up the sort evaluation required for a top-N query. During the processing of the data source of a top-N query by processing units, each processing unit generates top-N result set for one or more tiles evaluated by the processing unit. However, to produce the top-N result set across all processing units, the top-N data result sets across processing units are merged to produce top-N result set for the data source, in an embodiment.

Architectural Overview

FIG. 1 is a block diagram that depicts database management system (DBMS) 100 that executes a top-N query, in an embodiment. DBMS 100 includes database 102 that persistently stores database objects that may be queried when database server 110 receives and executes the top-N query. Database server 110 is a computer system that has various levels of memories available for processors 120 and 122 to execute the query, each level of memory having different data access speed. Processor 120/122 is a processing unit, the "processing unit" term refers to a hardware thread, core, or processor such as a hardware processor, or to a software process or thread that runs within a context of an operating system executing commands on a hardware processor.

Depending on the size of the data source for an operation, different memories may be utilized. In an embodiment, in which the data source of an operation is relatively large, all levels including slow but large capacity disk memory 112 may be used. In other embodiments, in which a data source of an operation is relatively small, system memory 114 and cache memories 130 and 132 may have affinity with processors 120 and 122 to execute the operation. Accordingly, when top-N data stores are small enough (i.e. number N is low), the processing units of DBMS 100 may utilize only faster memories to perform a top-N evaluation of a top-N query.

In an embodiment, DBMS 100 divides the data source of top-N query into one or more chunks and assigns each chunk to a different thread of processors 120 and 122. Accordingly, each thread, such as thread 150 gets assigned only a chunk of a data source of top-N query. To further improve the performance of top-N evaluation by avoiding data spill over into slower memories, each thread may load and process the assigned chunk one tile at a time, in an embodiment. For example, thread 150 may first process tile 150_1 before proceeding to the next tile of the first chunk. To even further improve the performance of the top-N query evaluation, thread 150, may load a single key of a tile at a time from database 102 into cache memory 130 and thus, take advantage of the column-based processing using techniques described herein.

In an embodiment in which, multiple processing units process a top-N query data source, the result sets stored in memories accessible by each of the processing units need to be merged. The merging may be complicated by the fact that a particular memory storing a particular result set may be only dedicated to a particular processor, meaning another processor cannot access the memory. For example, cache memory 130 is dedicated memory of processor 120, thus only processor 120 and its cores (core 140 and 142) and threads (thread 150-181) can access cache memory 130. Accordingly, if a top-N evaluation is performed by both processors 120 and 122 on cache memories 130 and 132, to generate the final result, the respective result sets of top-N evaluations are transferred to a different memory, in such an embodiment. When top-N data result sets have a relatively small size, the transfer can be performed faster and with less computation resources.

Top-N Data Store

To evaluate a top-N query of a data source, a processing unit may maintain one or more data structures for tracking the potential top-N values and their corresponding rows. In an embodiment, a processing unit may maintain a top-N data store. The term "top-N data store" refers to a data store that stores at least N number of sort key values. In an embodiment, a new sort key value is inserted into a top-N data store, only if the new sort key value can replace an existing sort key value in the top-N number of key values of the top-N data store. Stated differently, the new sort key value is inserted into the top-N data store only when the new sort key value is in top-N sort key values.

In an embodiment, a top-N data store contains a heap of at least N sort key values for efficient comparison of scanned sort key values from the data source (or tile thereof) with the sort key values stored in the top-N data store. The heap provides a tree based data structure of heap nodes, where each parent and child node have the same particular relationship. Each heap node is associated with a sort key value, while the corresponding row identifier (row index) for the row of the sort key value may be stored in an array of the top-N data store.

In one embodiment, the particular relationship of the heap nodes is based on a parent heap node having a greater or equal sort key value than the child(ren) heap nodes of the parent heap node. Such a heap with the particular relationship is referred herein as a "maximum" heap because the root heap node of the heap has the maximum sort key value in the top-N data store. Thus, a processing unit evaluating top-N query based on the ascending order sort key, may efficiently access the root heap node with the maximum sort key value to compare and perhaps replace the root node with a new sort key value.

In one embodiment, the particular relationship of the heap nodes is based on a parent heap node having a lesser or equal sort key value than the child(ren) heap nodes of the parent heap node. Such a heap with the particular relationship is referred herein as a "minimum" heap because the root heap node of the heap has the minimum sort key value in the top-N data store. Accordingly, a processing unit evaluating top-N query based on the descending order sort key, may efficiently access the root heap node with the minimum sort key value to compare and perhaps replace the root node with a new sort key value.

Determining Top-N Values in Key Column

An example of a top-N query is query Q1 below:

```
Q1:  SELECT *
     FROM tbl_test
     ORDER BY key1, key2 DESC
     FETCH FIRST 4 ROWS ONLY.
```

In query Q1, first 5 rows of "tb1_test" table are selected such that those rows contain the four greatest values in "key1" column, further arranged based on the descending order of corresponding values in "key2" column. Accordingly, the "key1" column is the first sort key of query Q1, while the "key2" column is the second (subsequent) key of query Q1.

Figure 2:
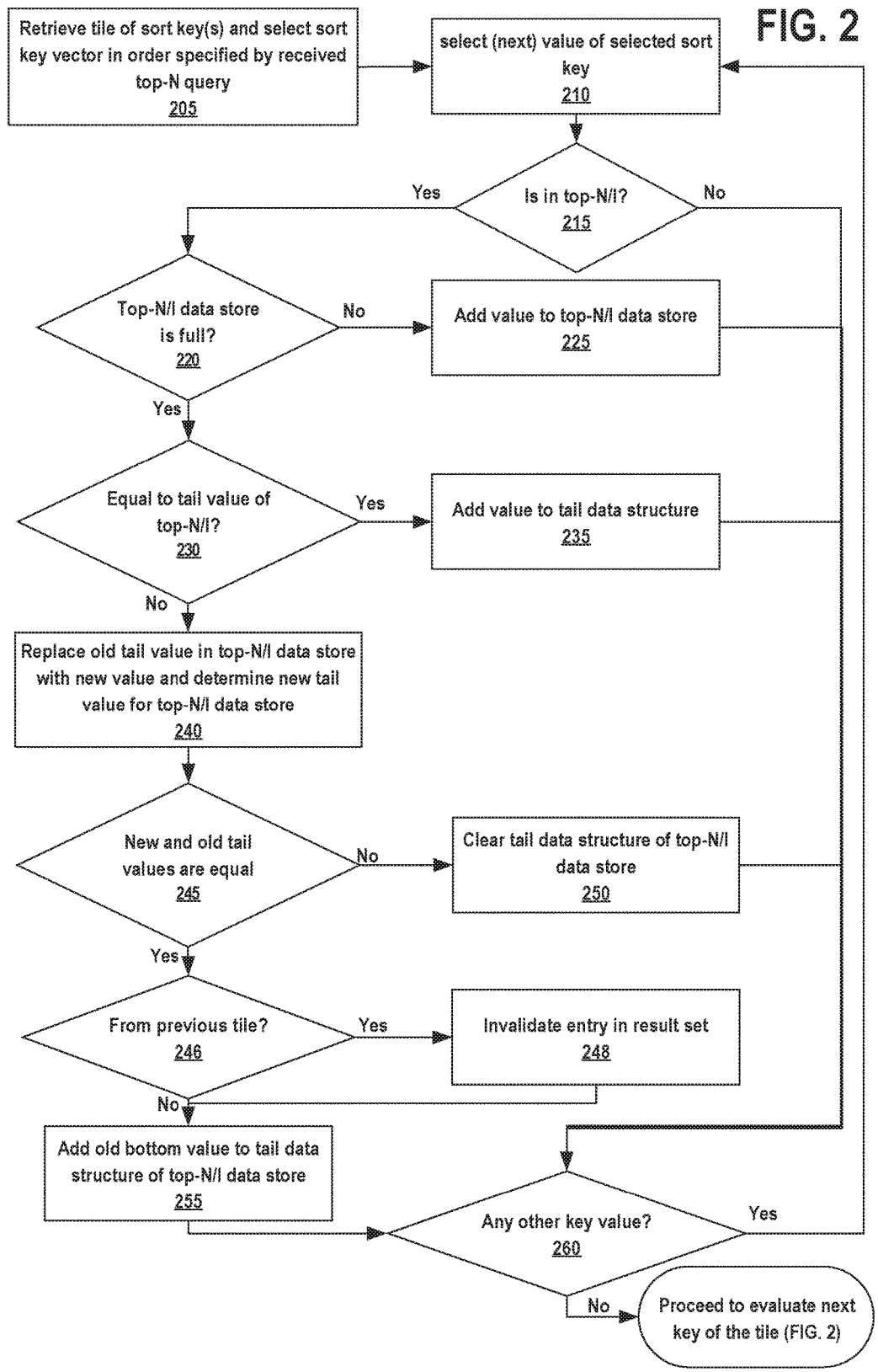
FIG. 2 is a flow diagram that depicts a process of executing top-N clause of a query on a data source, in an embodiment.

FIG. 2 is a flow diagram that depicts a process for evaluating a top-N query, such as query Q1, in an embodiment. At block 205, DBMS 100 loads a tile containing one or more vectors of sort keys for a top-N query execution. In an embodiment, DBMS 100 may retrieve a tile of the target data source of the query for each iteration of the data source processing. In another embodiment, a single sort key vector of the tile is loaded to be processed in an iteration of the top-N query evaluation. As such an example, during the first iteration of evaluating a target data source of top-N query, DBMS 100 may retrieve the first key vector of values that are within the first tile of the target data source.

At block 210, DBMS 100 selects a key value from the tile containing the key values for a top-N evaluation. DBMS 100 first processes the vector of the first key column of the sort keys specified in the top-N query and iterates through each key value of the first vector until the vector values are exhausted at block 260. In an embodiment, rather than iterating through the first N-number of first key values in the first vector, DBMS 100 may initialize the top-N data store to store the first N-number of first key values. After iterating through first key values of the tile and evaluating them, DBMS 100 may select certain values from the next key vector of the tile based on the evaluation. When the next key values are evaluated, DBMS may use another data store, top-I data store, to track the necessary top values from the next key vector. For the next key evaluation, as described further in detail below, DBMS 100 may use one or more next key values based on the first key vector evaluation to initialize the top-I data store.

Figure 3A:
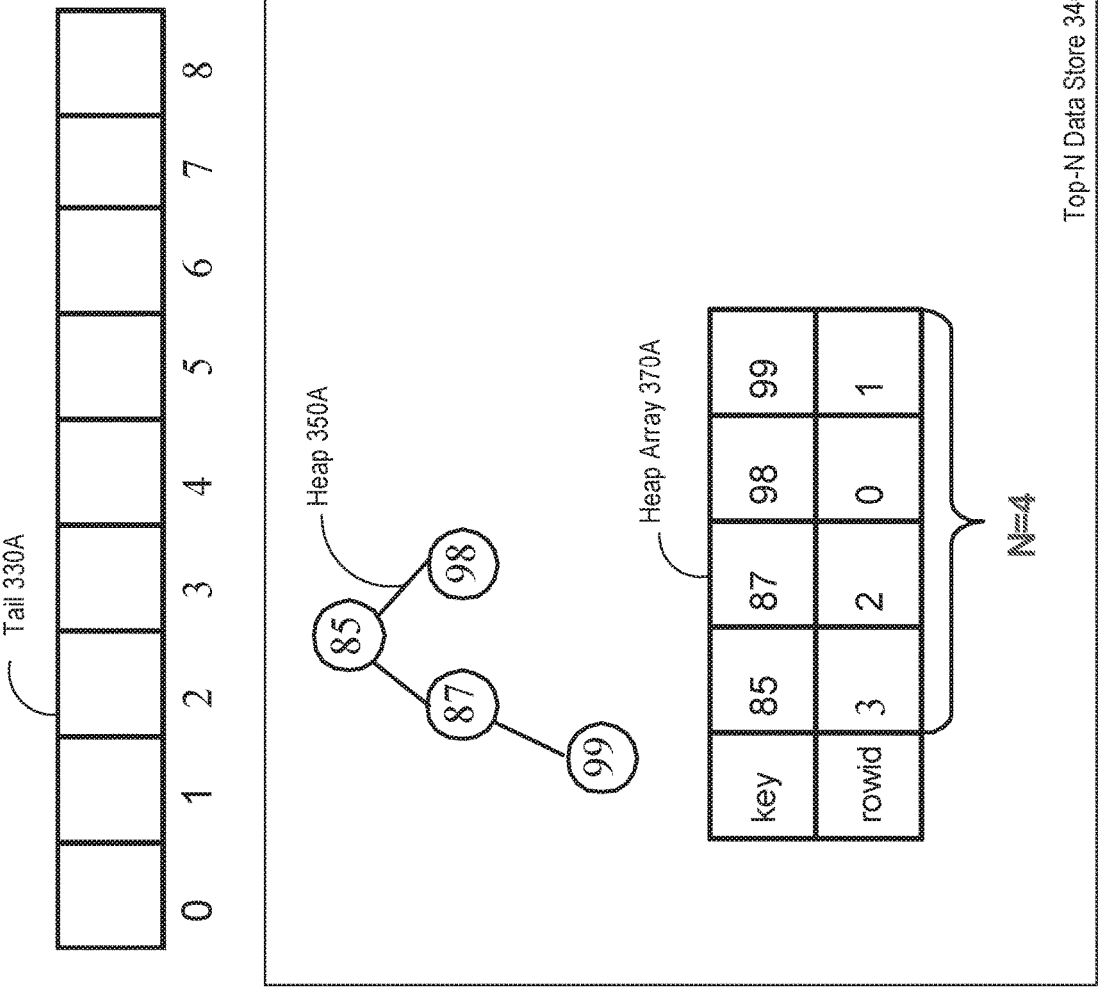
FIGS. 3A-N are block diagrams that depict examples data structures for processing one or more tiles of a target data source of example query Q1, in one or more embodiments.

FIG. 3A is a block diagram that depicts an example of a first tile of a target data source of example query Q1 and data structures, such as tail 330A and top-N data store 340, for processing the tile, in an embodiment. DBMS 100 scans the first four values of the first key, "key1," vector from tile 310 and inserts them into top-N data store 340's heap 350A. Additionally, top-N data store 340 may include a heap array that stores pointers to rows in a tile being processed, corresponding to each element in the heap of top-N data store 340. For example, heap array 370A in FIG. 3A stores row identifiers, "rowids", of the rows in tile 310 corresponding to each value in heap 350A. Although, FIG. 3A depicts a separate column for "rowids", a tile may not have such a column, and "rowids" in this example would represent index positions of the vector values in a tile.

At block 210, when the next key value of the first key vector is selected by DBMS 100, the key value is compared with the one or more values in a top-N/I data store, at block 215, to determine whether the selected key value is within top-N/I values of the key, in an embodiment. In one embodiment, the key value is compared with the tail value of the top-N/I data store. A key value is "above" the tail value, if the key value is greater than the tail value for the descending order specified key in the top-N query and is lesser than the tail value for the ascending order specified key. Conversely, a key value is "below" the tail value, if the key value is lesser than the tail value for the descending order specified key in the top-N query and is greater than the tail value for the ascending order specified key.

If the selected key value is determined to be below the tail value of the top-N/I data store, then the process transitions to block 260, and DBMS 100 may select the next value in the selected key at block 210. However, if the selected key value is determined to be above or equal to the tail value of the top-N/I data store, the process determines in the subsequent blocks whether to add the selected key value, at block 225, to the top-N/I data store, or to add the key value to the tail data structure at block 235. The process additionally determines how to process one or more old key values that used to be within the top-N/I values before the selected key value was processed but are now below the tail value of the top-N/I data store.

In an embodiment, in which top-N/I data store is a heap-based data structure, the determination at block 215 (whether the selected key value is in top-N/I key values) is performed by comparing the selected key value with the root element of the heap. If the sort specification for the key in the top-N query is in descending order, then the heap is arranged with the root element containing the minimum value of the heap elements. Conversely, if the sort specification for the key in the top-N query is in ascending order, then the heap is arranged with the root element containing the maximum value of the heap elements. Accordingly, in such an embodiment, the root element value is equal to the tail value of the top-N/I data store, and is used to determine whether the selected key value is within the top-N values.

At block 220, DBMS 100 may check whether the top-N/I data store is full (stores an N/I-number of values) to insert the newly selected key value into the data store that was determined to be in the top-N/I values. In such an embodiment, the process proceeds to block 230 to determine whether the selected key value of the first key is equal to the tail value of the top-N/I data store. Based on this determination DBMS 100, either stores the selected key value into the tail data structure at block 235 or in the top-N/I data store according to techniques described at blocks 240-260.

In an embodiment in which the top-N/I data store is a heap-based data structure, the root element of the heap is the tail value of the current top-N/I values in the top-N/I data store. Accordingly, DBMS 100 compares the selected value to the root element of the heap to determine whether the selected value is equal to the current tail value. If it is determined that the selected key value is not equal to the root element, then the selected key value of the first key has to replace one of the values in the top-N/I data store as described in blocks 240-260. On the other hand, if, at block 230, the selected key value is equal to the root value of the heap, then, in an embodiment, the selected key value of the first key is added to the tail data structure at block 235.

In an embodiment, a tail data structure is implemented as an array-based or stack-based data structure that, additionally or alternatively to key values, contains the corresponding row identifiers of the key values in the corresponding key vector or the data source. The row identifiers may be in a form of an actual index value of the index for the rows in the tile or the data source, memory address of the entry in the corresponding key vector in the tile, an offset of a memory address for the key vector or any other memory pointer to the key vector or the corresponding data source.

In an embodiment, DBMS 100 stores in a tail data structure all the key values that are equal to the current tail value of the top-N data store. Doing so, DBMS 100 determines the rows that cannot be unambiguously selected based on the current key and may need the next key to be processed to determine which of the rows are to be selected for the result set of the received top-N query. Such processing, as discussed above, improves the execution of the top-N query by taking advantage of the improvements in columnar data processing for query executions.

Figure 3B:
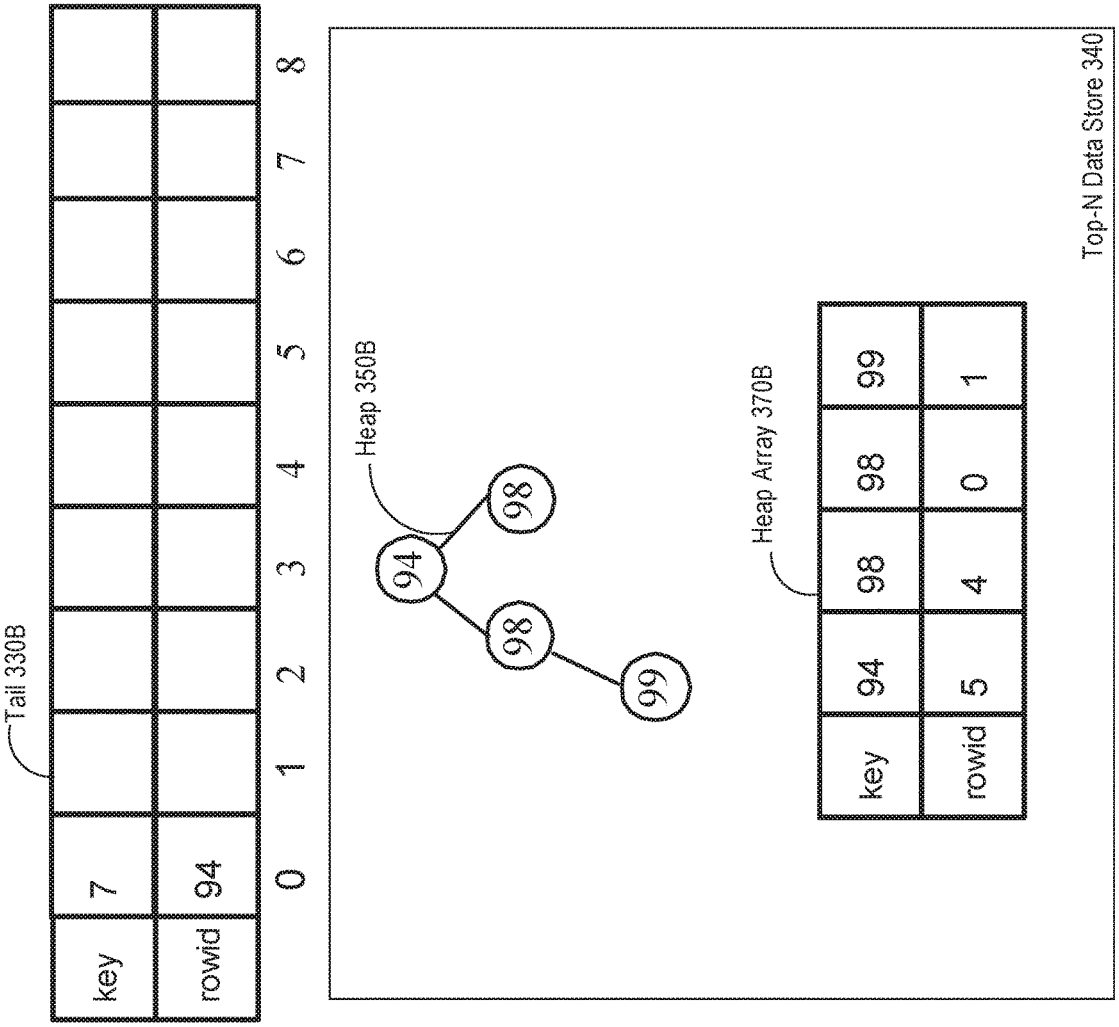

For example, FIG. 3B is a block diagram depicting data structures for evaluating query Q1 while processing "rowid" 7 of key "key1" vector of first tile 310. The selected value "94" at "rowid" 7 is compared to the current root element of heap 350B, value "94" from "rowid" 5. The two values are equal, and thus, the selected value is part of top-N values. Since the top-N data store 340 is full, the new selected value is inserted into tail data structure 330B (heap 350B and corresponding heap array 370B) in this example.

A tail data structure may be cleared by DBMS 100, if DBMS 100 selects a key value that is greater than the tail value of the top-N/I data store of the tail data structure. At block 230, if the selected key value in the first key is above the tail value of a top-N/I data store, one of the tail values in the top-N/I data store is replaced by the new selected key value at block 240.

In an embodiment, once the current tail value is removed and the selected value is added to the top-N/I data store, DBMS 100 determines the new tail value for the top-N/I data store at block 240. In an embodiment in which the top-N/I data store is a heap-based structure, DBMS 100 may execute a re-heapifying algorithm to re-arrange the heap according to the particular rules of the heap. Such an execution causes the heap to be re-arranged with the tail value of top-N/I values resulting as the root element of the heap. Other algorithms, such as performing minimum or maximum function, may be used for determining the new tail value of the top-N/I data store. The exact algorithm used is not critical to the techniques described herein.

In an embodiment, DBMS 100 clears the tail data structure at block 250, if the new and old tail values fail to match at block 245. Such an inequality of the new and old tail values indicates that the old tail value is strictly below than the new tail value and therefore, is no longer within top-N/I values of processed key values of the key. Since the key values in the tail data structure are equal to the old tail value of the top-N/I data store, those key values are also no longer in the top-N/I values. Accordingly, not only the old tail value may be discarded but also all the values (if any) in the tail data structure may be discarded at block 250 as well.

On the other hand, if the old and new tail values are equal at block 245, then the old tail value still remains within the top-N/I values, and thus, DBMS 100 preserves the remove tail value entry. At block 255, DBMS 100 stores the old tail value in the tail data structure.

Additionally, in an embodiment, at block 246, if the removed tail value indicated to have originated from the previous tile processing, then, at block 248, the entry in the result set of the previous tile that corresponds to the old tail value is invalidated. The invalidated entry may be revalidated, if based on the evaluation of one or more values of the next key, the row containing the old tail value is re-selected for the result set of the received top-N query. (See the "NEXT TILE EVALUATION" section for more details.)

Figure 3C:
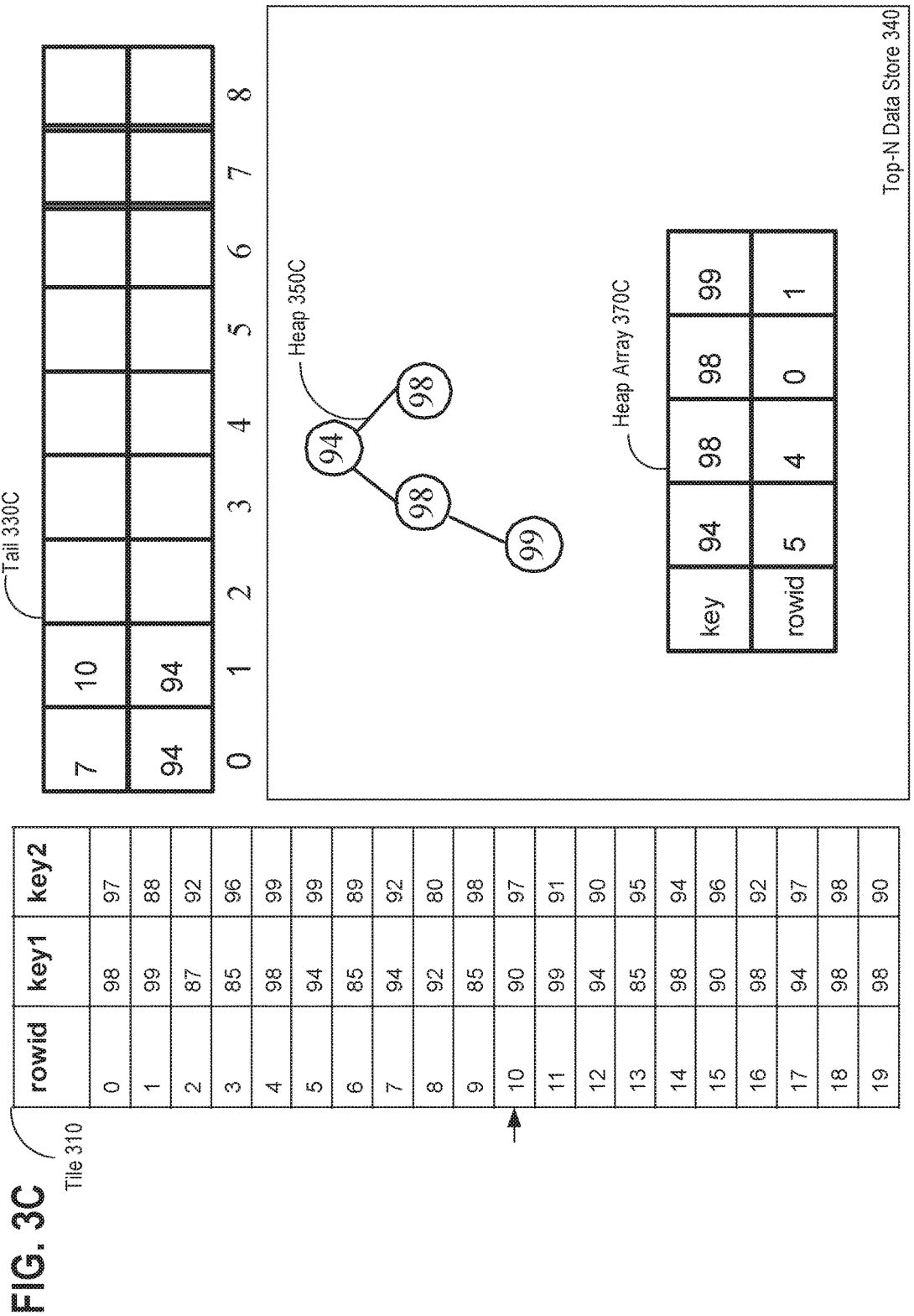
Figure 3D:
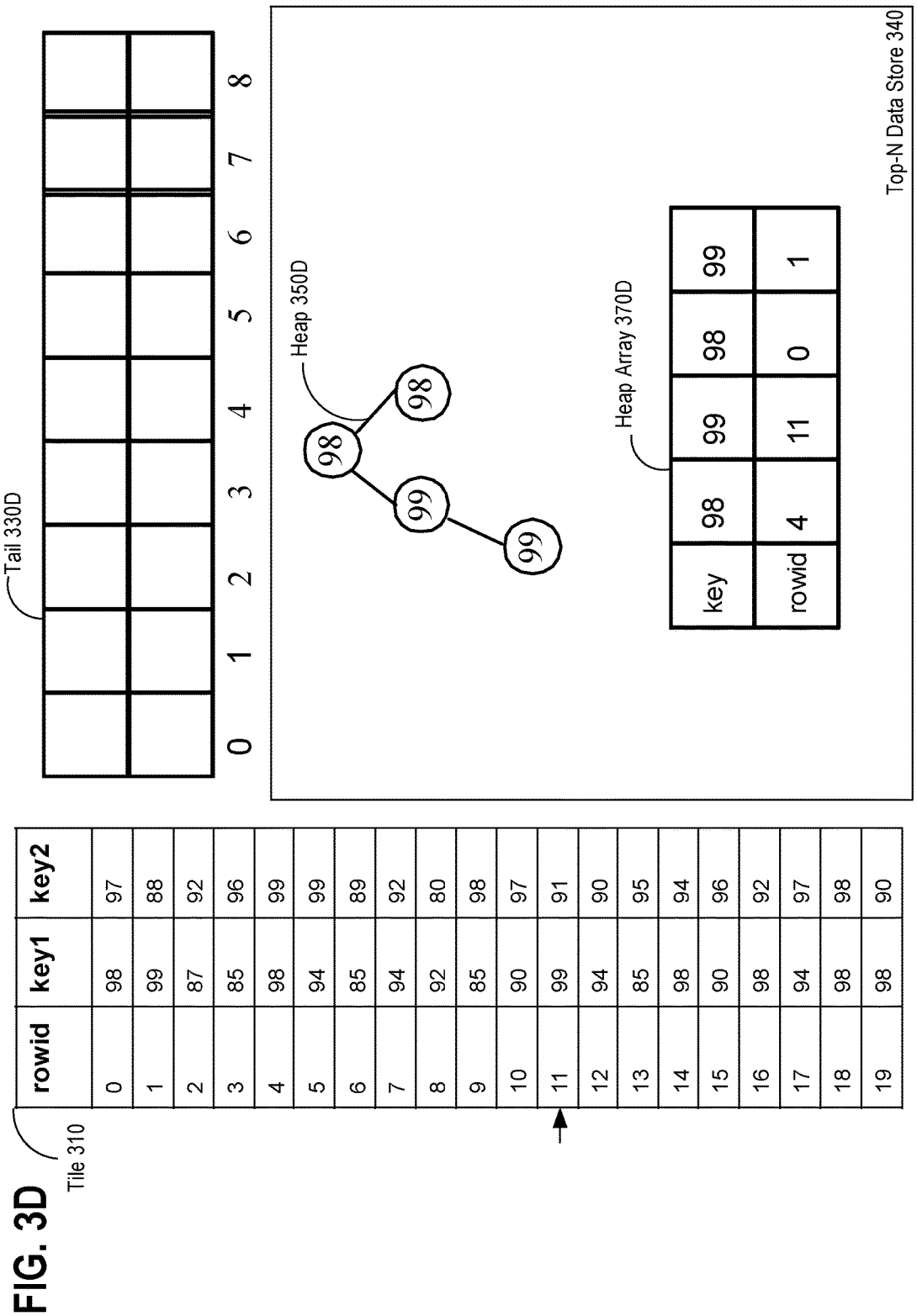

For example, FIGS. 3C and 3D are block diagrams depicting data structures for evaluating query Q1 after processing respective rows with "rowid" 10 and 11 of key "key1" of first tile 310, in an embodiment. The tail value of top-N data store 340 from evaluating "rowid" 0 through 10 of the key "key1" vector for top-four values is the value of "94" in FIG. 3C. Accordingly, the root element of heap 350C as well as the key values in tail 330C contain the value of "94" for rows 5, 7 and 10 of "key1" key vector, respectively.

Next, as an illustrative example, the key value of "99" from "rowid" 11 of key "key1" vector is evaluated for execution of query Q1, in FIG. 3D. Since the value of "99" is greater than the current heap 350C root element value of "94" in FIG. 3C, the new value is in top-four possible values for query Q1. While the new selected value is in top-four values, the top-N data store 340 is full, and thus, the new selected value may not be inserted into top-N data store 340 without another value being removed. As the root element is the current tail value of the top-N data store and the root element value of "94" is not equal to the new selected value of "99", the root element is removed from heap 350C and replaced by the new value of "99" with "rowid" 11, as depicted in FIG. 3D. Heap array 370C is similarly updated as depicted in heap array 370D of FIG. 3D. Top-N data store 340 is re-heapified to re-arrange the elements according to the minimum element being at the root of the heap.

In FIG. 3D, heap 350D and heap array 370D are the new heap and heap array with the addition of the new selected value "99" at "rowid" 11. The new root element of heap 350D has value "98", which is not equal to the old root element value of heap 350C, "94", and thus, the old root element is no longer within top-four values for query Q1. Since tail data structure 330C of FIG. 3C contains values equal to the old root element value of "94", tail 330C along with the old root element are cleared. Tail 330D depicts the cleared tail data structure in FIG. 3D.

Figure 3E:
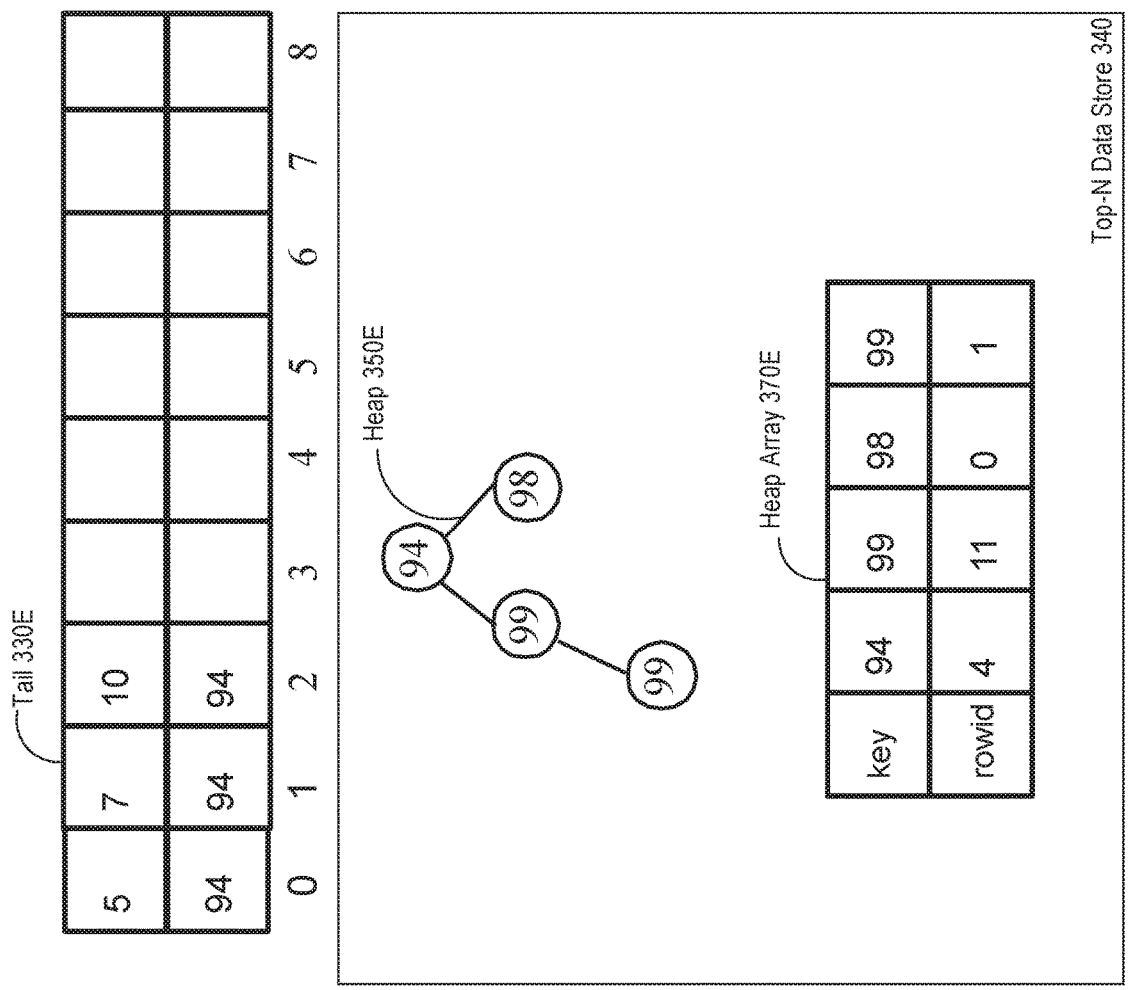

In an alternative example depicted in FIG. 3E, in which another value in top-N data store 340 is equal to the old root element of heap 350C of FIG. 3C, tail data structure 330C is not cleared. Rather, because the new root element of heap 350E is equal to the old root element of heap 350C, the old root element of heap 350C is added to tail 330E, as depicted in FIG. 3E.

Figure 3F:
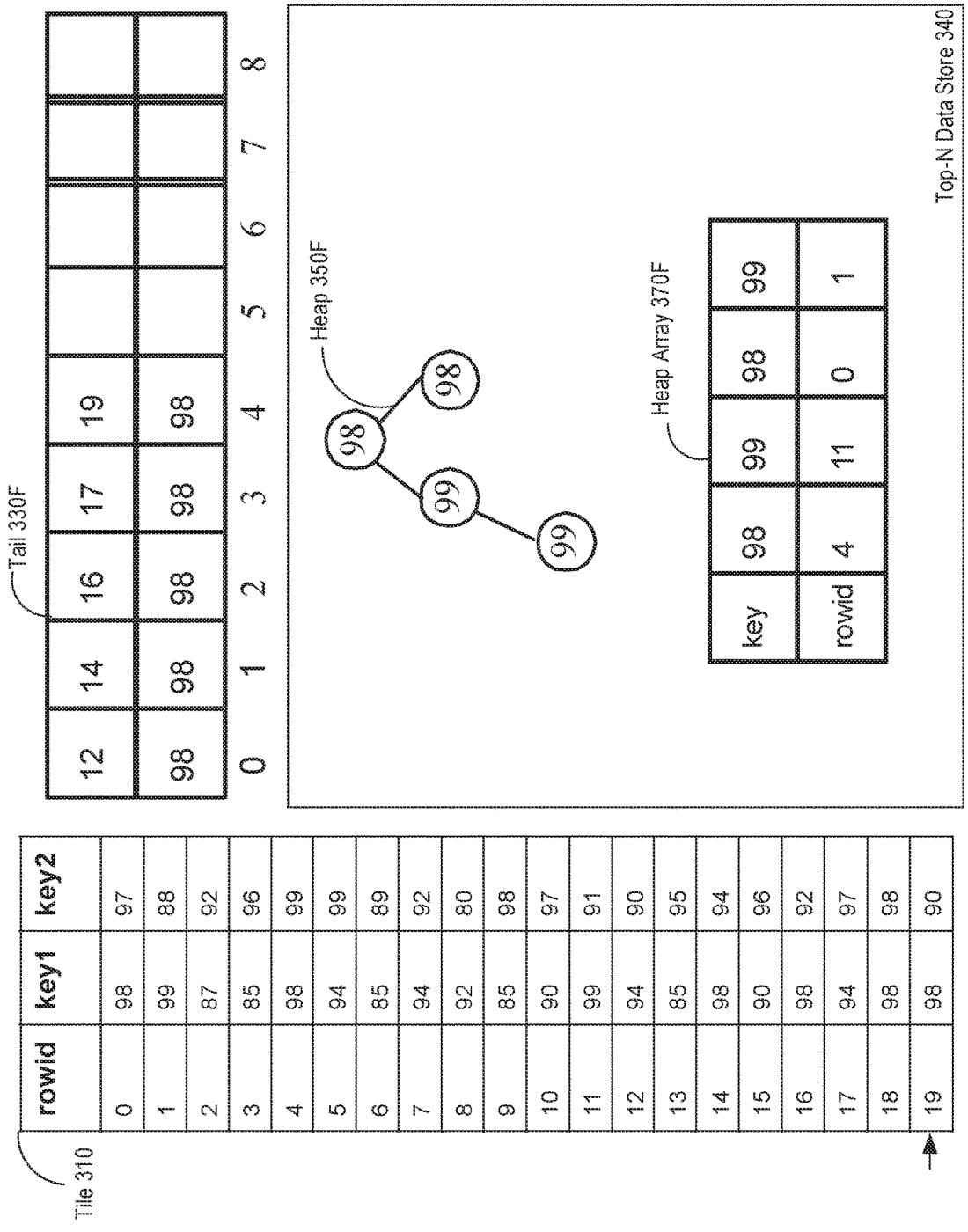

Continuing with FIG. 2, at block 260, DBMS 100 processes the rest of the first key values in the first (and subsequent) tile(s) using the techniques described above. As a result of evaluation, DBMS 100 either discards the new selected value of the selected key because it is not within the top-N/I values as identified by the current values in the top-N/I data store, or otherwise, stores the new selected value either in the top-N/I data store or the tail data structure thereof. For example, FIG. 3F is a block diagram that depicts top-N data store 340 and tail data structure 330F after all values for key "key1" in tile 310 have been processed for query Q1, in an embodiment.

Grouping Tail Values for Next Key Evaluation

In an embodiment, the evaluation of the vector values of a first sort key may not yield exactly an N-number of first key values for a top-N query. For example, the number of first key values after the top-N evaluation of the first key vector may exceed the N-number because multiple entries of the first key vector may have a tail value.

If no other sorting key is specified in the top-N query, then DBMS 100 may arbitrary select as many row identifiers with the tail value-equal key values as is necessary to have a total of N-number of entries as a result for the tile evaluation. On the other hand, if another sorting key is specified in the top-N query, then after evaluating the vector values for the first (or previous) key, DBMS 100 may evaluate the vector values of the next sort key.

To evaluate the next sort key of a tile, if any exists, DBMS 100 "groups" all the previously evaluated key values of the tile that are equal to the previous key tail value, in an embodiment. The term "group" (or "grouping") refers to the process of aggregating row identifiers of the vector entries that have to be evaluated based on the next key to determine whether one or more of the vector entries are part of a top-N result.

Figure 4:
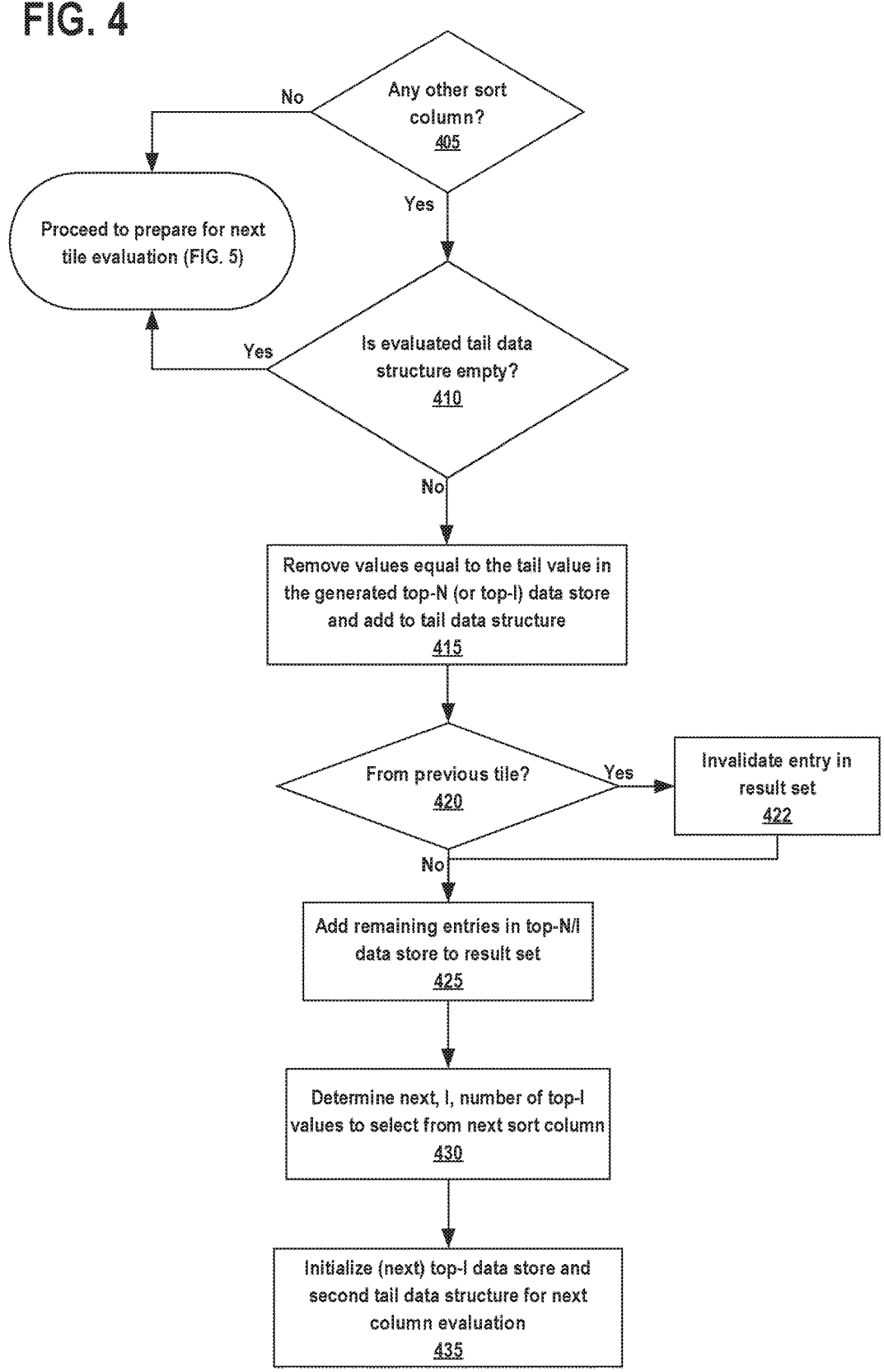
FIG. 4 is a flow diagram depicting the process for grouping results from the evaluation of a previous key of a tile to evaluate the next sort key, in an embodiment.

FIG. 4 is a flow diagram depicting the process for grouping results from the evaluation of a previous key of a tile to evaluate the next sort key, in an embodiment. At block 405, DBMS 100 selects the next sort key to evaluate. If no other sort key is specified by the received top-N query other than the already evaluated ones, then DBMS 100 may proceed to initializing data structures for processing the next tile, if any (for example, using the process depicted in the flow diagram of FIG. 5). If there is another sort key specified in the top-N query, at block 410, DBMS 100 determines based on the previously evaluated tail data structure whether the next sort key is necessary to process. If the key tail data structure from the previous key evaluation ("previous key tail data structure" hereafter) is empty at block 410, then the evaluation of the previous key(s) has already yielded exactly N-number of values for the top-N query, and the process proceed to initializing data structures for processing the next tile, if any (for example, using the process depicted in the flow diagram of FIG. 5).

If the previous key tail data structure is not empty at block 410, then the entries in the next key vector corresponding to the row identifiers stored in the previous tail data structure are to be further evaluated, and the process proceeds to block 415.

In addition to the previous key values in the previous tail data structure, one or more values equal to the tail value may be stored in top-N (or top-I as described below) data store. In an embodiment, at block 415, DBMS 100 scans the data store to find one or more values equal to the tail value into the previous key tail data structure. Additionally or alternatively, DBMS 100 stores in the previous key tail data structure the corresponding row identifier(s) of the tail values in the data store. Accordingly, DBMS 100 groups entries of the previous key vector corresponding to the tail values in the previous key tail data structure.

In an embodiment, if, at block 420, one or more values from the data store to be grouped into the previous tail data structure are indicated to have originated from the previous tile processing, then DBMS 100 invalidates the corresponding entries of those values in the result set from the previous tile processing at block 422. (See the "NEXT TILE EVALUATION" section for more details.)

In an embodiment in which the top-N data store is a heap-based data structure, DBMS 100 groups the tail values by selecting the root element value and any other value(s) in the heap that are equal to the root value. DBMS 100 stores the selected values in the previous key tail data structure, along with the corresponding row identifiers. In one embodiment, DBMS 100, may remove the root element from the heap, store the removed value in the previous key tail data structure and heapify the remaining elements to retrieve the next root element. If the next root element value is equal to the previous root element value, then DBMS 100 repeats the removal and storing of the current root element value of the heap into the previous key tail data structure until the previous root element value and the new root element value are not equal.

After the removal of the tail values from the data store, the remaining values are part of the result set for the top-N query for the evaluated tile. At block 425, a result set data structure, if not initialized, is initialized and the remaining values from the top-N data store with the corresponding row identifiers are stored in the result set data structure, in an embodiment.

To illustrate an example of grouping previous key values using query Q1, FIG. 3F is a block diagram that depicts data structures after processing the "key1" key vector of tile 310, in an embodiment. To group tail values in tail data structure 330F, the root element of heap 350F is removed and added to tail 330F. Thus, another "98" value for the "key1" key is added to tail 330F corresponding to row "4" (not depicted in FIG. 3F). Heap 350F is then re-heapified to yield a new root element value of "98" corresponding to row "0" (not depicted in FIG. 3F). Since the new root element and the previous root element have both value "98", the new root element is also removed from heap 350F and added to tail 330F (not depicted in FIG. 3F). Heap 350F is heapified again, and the new root element value of "99" is compared with the previous root value of "98". Because the root element values do not match, all the tail values ("98") have been removed from top-N data store 340's heap 350F and corresponding heap array 370F.

Figure 3G:
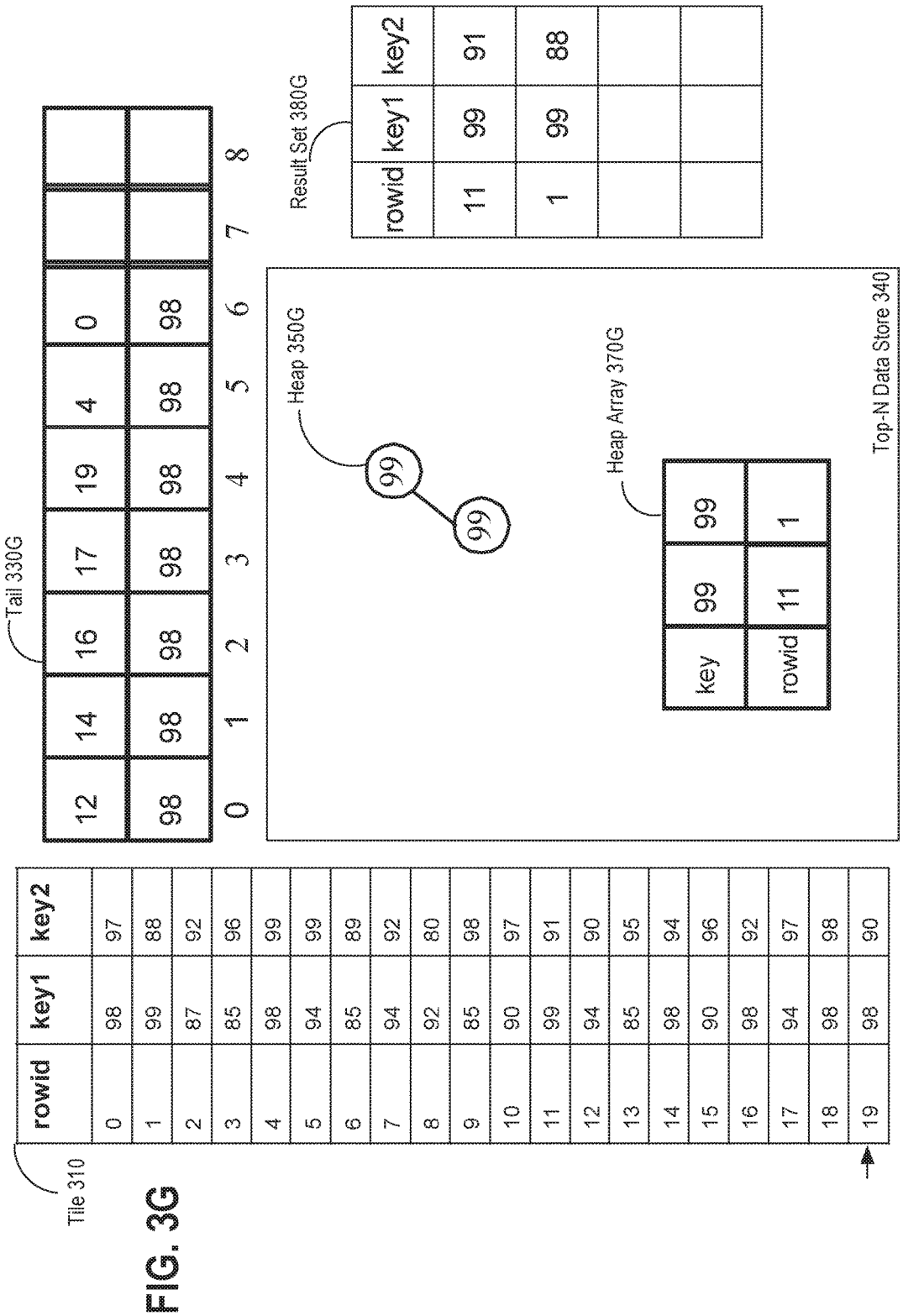

FIG. 3G depicts example data structures that result from grouping tail values of top-N data store 340 of FIG. 3F as described in the example above, in an embodiment. As the result of the example grouping, tail 330G references all the rows with the tail value of "98" according to the evaluation of the "key1" key vector of tile 310. Heap 350G and corresponding heap array 370G contain the unambiguous top-4 result entries for tile 310. These remaining heap entries in top-N data store 340 of FIG. 3G may be stored in a result set data structure such as result set 380G. Result set 380G may contain key values for the key to be evaluated "key2" in addition to the key values for the evaluated "key1" key as depicted in FIG. 3G. Since result set 380G unambiguously identifies the top-two values out in tile 310 of top-4 values for query Q1, the other top-two values, top-I values, need to be identified based on the row identifiers in tail 330G using the next key vector, "key2" as specified in query Q1.

Next Key Evaluation

The term "top-I" refers to the I-number of entries of the next key vector that are selected for the result set based on the next key value evaluation. In an embodiment, the previous key vector evaluation has unambiguously selected I-number less entries than the top-N rows requested by a received query. Accordingly, continuing with FIG. 4 at block 430, DBMS 100 determines the I-number by subtracting the already determined number of results from the previous key vector evaluation from the N number.

At block 435, to evaluate the next key vector of the tile, DBMS 100 may initialize a top-I data store with memory space to store I-number of next sort key values and/or corresponding row identifiers. Additionally, a new tail data structure is initialized to store tail value-equal row identifiers during the next key evaluation.

In an embodiment, the top-I data store is initialized with the entries of the next key vector that correspond to the row identifiers of the grouped previous tail data structure. In such an embodiment, the evaluation of the next key vector starts at the row identifier corresponding to the entry following the first I-number of entries in the previous tail data structure.

Figure 3H:
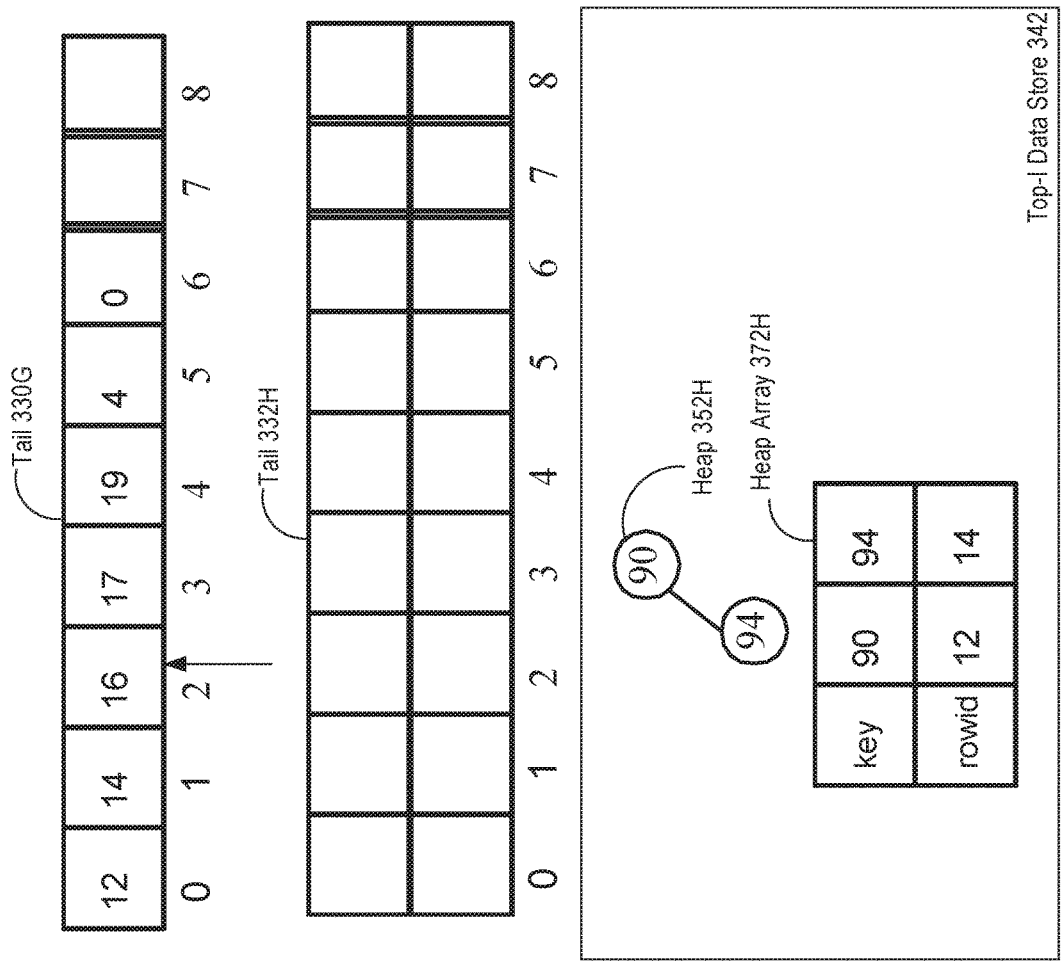

Continuing with query Q1 evaluation using tile 310, FIG. 3H is a block diagram depicting initialized top-I data store 342 and corresponding tail data structure 330H, in an embodiment. Since result set 380G of FIG. 3G for previous key evaluation of tile 310 has yielded two rows of top-four for query Q1, new top-I data store 342 has two-node heap 352H and two-entry heap array 372H. To initialize top-I data store 342, the "key2" entries referenced by the row identifiers of the first two entries in previous tail 330G are loaded in top-I data store 342. Thus, heap 352H contains "key2" values "94" and "90" that are the "key2" vector values at rows 12 and 14 as referenced by the entries 0 and 1 in tail 330G and now also referenced in heap array 372H, respectively.

In an embodiment, after an initialization of a top-I data store, DBMS 100 proceeds to the blocks described in FIG. 2 for evaluating the tile 310 based on the next key and determining the values and rows for a top-I data store. However, at block 210 of FIG. 2, rather than iterating through every entry in the first key vector of the tile, DBMS 100 iterates only through the rows referenced in the previous tail data structure to select the next key values for the evaluation. By iterating through the next key values indicated by the previous tail data structure row identifiers, DBMS 100 determines the entries of the tile that contain the top-I values of the next key using the technique described in FIG. 2. In an embodiment, the resulting new tail data structure from the next key evaluation is grouped using the techniques described above, an example of which is depicted in FIG. 4.

Figure 3I:
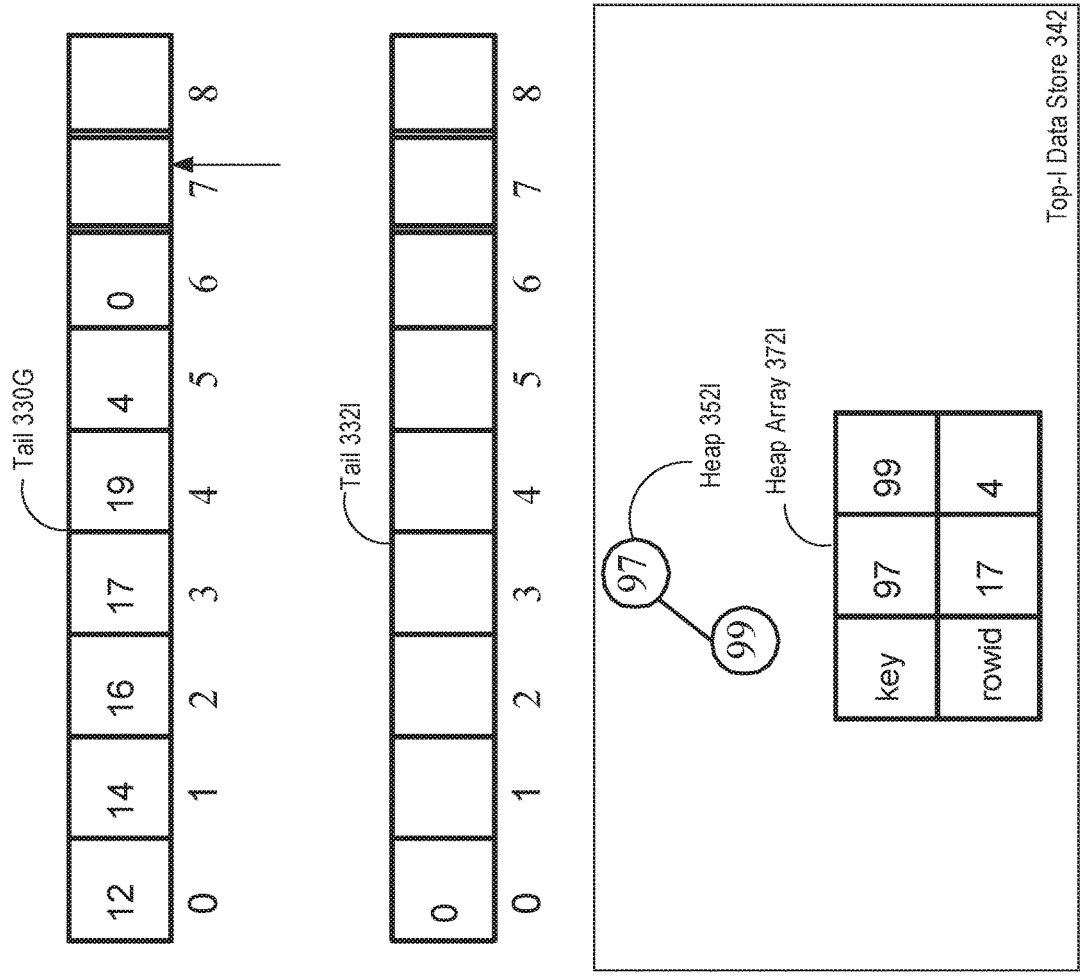

FIG. 3I is a block diagram that depicts example top-I data store 342 and tail data structure 332I generated from the "key2" key vector evaluation of query Q1. Using the row identifiers from previous tail 330G of the "key1" vector, the "key2" vector values are selected from tile 310 for evaluation. The evaluation of the "key2" key yields top-I data store 342 storing two row identifiers for the other top-2 result entries. The example evaluation has also generated a new tail data structure, tail data structure 332I. Since tail 332I is not empty, the next key evaluation of the "key2" key has not produced an unambiguous result for top-2 in tile 310 for query Q1. DBMS 100 may group tail value-equal values from top-I data store 342 into tail 332I, to evaluate yet another key if such is specified by query Q1, or to arbitrarily select any number of rows from tail 332I as necessary.

In an embodiment, in which after the evaluation of the next key values referenced by the row identifier in the previous tail data structure, the new tail data structure is not empty, another key, if any, is evaluated using same techniques as described for the next key evaluation. The resulting entries in the top-I data store may be added to the result set generated from the previous key vector evaluation. The result set may be augmented with the next key evaluation results by accessing the row identifiers referenced by the top-I data store.

On the other hand, if no other key is indicated by the top-N query, then one or more rows of the next key that contain tail value-equal values are arbitrarily selected to produce the top-I entries, in an embodiment. The number of tail-equal value rows to arbitrary select depends on the number of the next key vector entries that have been unambiguously identified to be part of top-I result. In one embodiment, DBMS 100 selects the top-I result entries by directly selecting entries corresponding to the row identifiers that are specified by the top-I data store. In such an embodiment, DBMS 100 ignores the one or more row identifiers specified by the tail data structure. In another embodiment, DBMS 100 groups the tail-equal value row identifiers in the tail data structure according to techniques described above (example of which is depicted in FIG. 4) and then arbitrarily selects the row identifiers from the grouped tail data structure.

For example, as discussed above with the reference to FIG. 3I, the next key evaluation yields tail data structure 332I which is not empty, and thus, at least one other tail value also exists in top-I data store 342 at its root element in addition to the tail value in tail 332I. DBMS 100 may remove the root element "97" of row 17 from heap 352I (and corresponding heap array 372I) and insert the row identifier into tail 332I. The only left node in heap 352I is also a new root element, which value, "99", is not the same as the old root element value "97". Thus, after the removal of value "97", the updated top-I data store contains unambiguous row(s) for top-N query Q1 based on the "key2" key vector evaluation. The tail-equal value rows of "key2" are stored in the grouped tail data structure of the "key2" key vector evaluation.

Figure 3J:
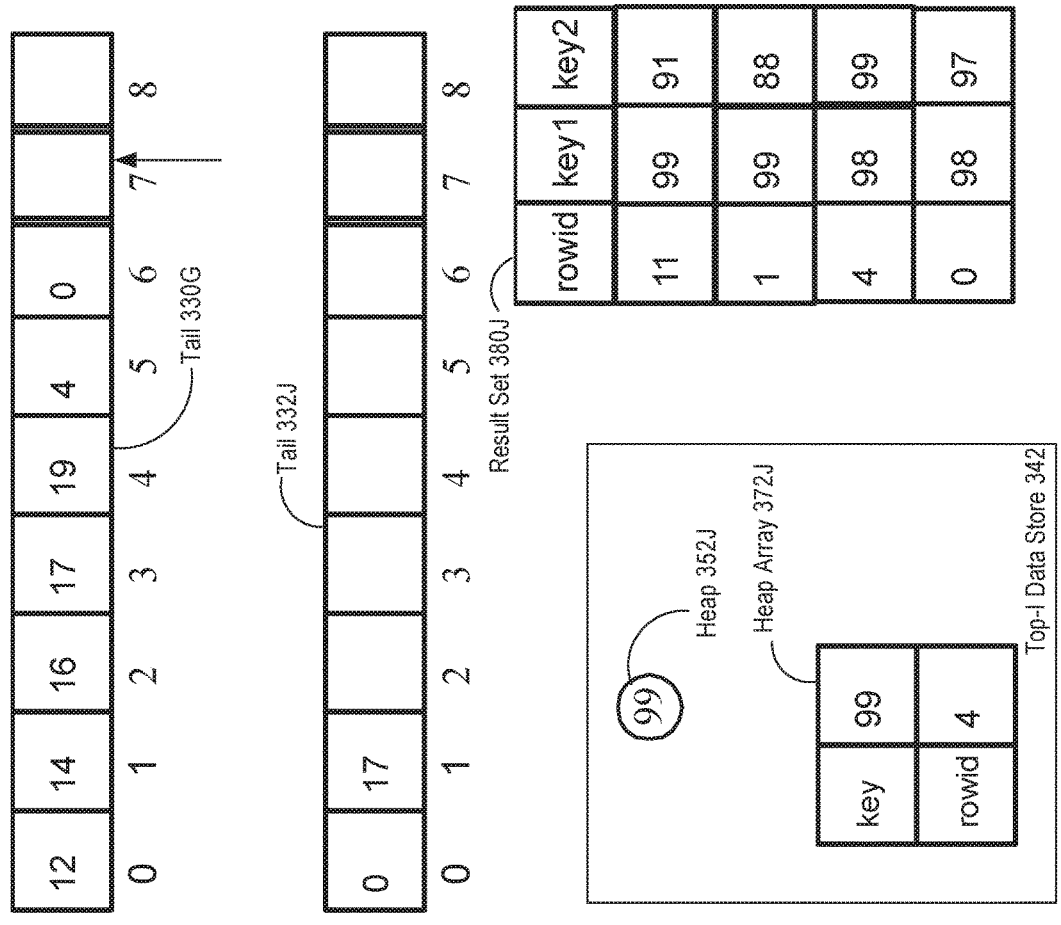

The grouped tail data structure, tail 332J, and resulting top-I data store 342 are depicted in FIG. 3J, as an example. Heap 352J and heap array 372J have yielded only a single unambiguous row from the evaluation of the "key2" key vector of tile 310, which in addition to the rows identified by the "key1" key evaluation is the third row out of top-4 requested by query Q1 in result set 380J. To select the fourth entry for result set 380J for query Q1, DBMS 100 may arbitrarily select one of the elements from grouped tail 332J.

In an embodiment, to arbitrary select the remaining rows after the last key evaluation for a top-N query, DBMS 100 sequentially selects as many elements from the tail data structure as needed to have N-number of result entries for the received top-N query. For example, for FIG. 3J's tail data structure 332J, DBMS 100 may select the first element of tail 332J, row 0, as the fourth row for top-N query Q1. In another embodiment, DBMS 100 randomly selects as many rows from the grouped tail data structure as necessary.

In an embodiment, the selected row from the new tail data structure is added to the result set for the received top-N query. For example, result set 380G of FIG. 3G has been augmented with the row "4" result from the top-I data store and selected row "0" result from tail 332J to yield result set 380J as depicted in FIG. 3J. If no other tile than tile 310 exists for "tb1_test" specified in query Q1, as an example, result set 380J is used to return the result for the query Q1 execution.

Sort-Based Next Key Evaluation

As another alternative approach to generate result set for the tile being evaluated, DBMS 100 may skip evaluating the next one or more key vectors one at a time and instead evaluate the remaining one or more key vectors all at once. To do so, DBMS 100 may retrieve the entries of remaining key vectors referenced by the previous tail data structure as rows of the tile. DBMS 100 may sort the rows to arrange rows based on the one or more next keys in the order specified in the received top-N query. Once the rows are arranged according to the one or more next keys, DBMS 100 may select as many rows as it is necessary to select after the previous key evaluation (I-number of rows).

The sort-based approach of the next sort key evaluation may be particularly efficient and consume less resources when the number of entries to retrieve from the next key vector(s) is small. The number of rows to retrieve generally depends on the number of entries in the previous tail data structure. The efficiency of the sort based approach also further depends on the number of next key vectors remaining to be evaluated. Lesser key vectors remain to be evaluated, lesser computing resources need to be spent on sorting the values.

For example, continuing with the query Q1 execution example, after tile 310's "key1" key vector evaluation, tail data structure 330G as depicted in FIG. 3G only contains 7 entries. Further, only another key vector, the key "key2" vector, is specified by top-N query Q1. Accordingly, the next key "key2" vector evaluation can be efficiently performed in this example after the previous "key1" key evaluation. Rather than iterating through the row identifiers specified in tail 330G for the "key2" key vector to determine the remaining two rows from tile 310, DBMS 100 retrieves all the rows specified by tail 330G from tile 310 in this example. DBMS 100 may sort the retrieved rows based on the "key2" key in the descending order specified by query Q1.

Figure 3K:
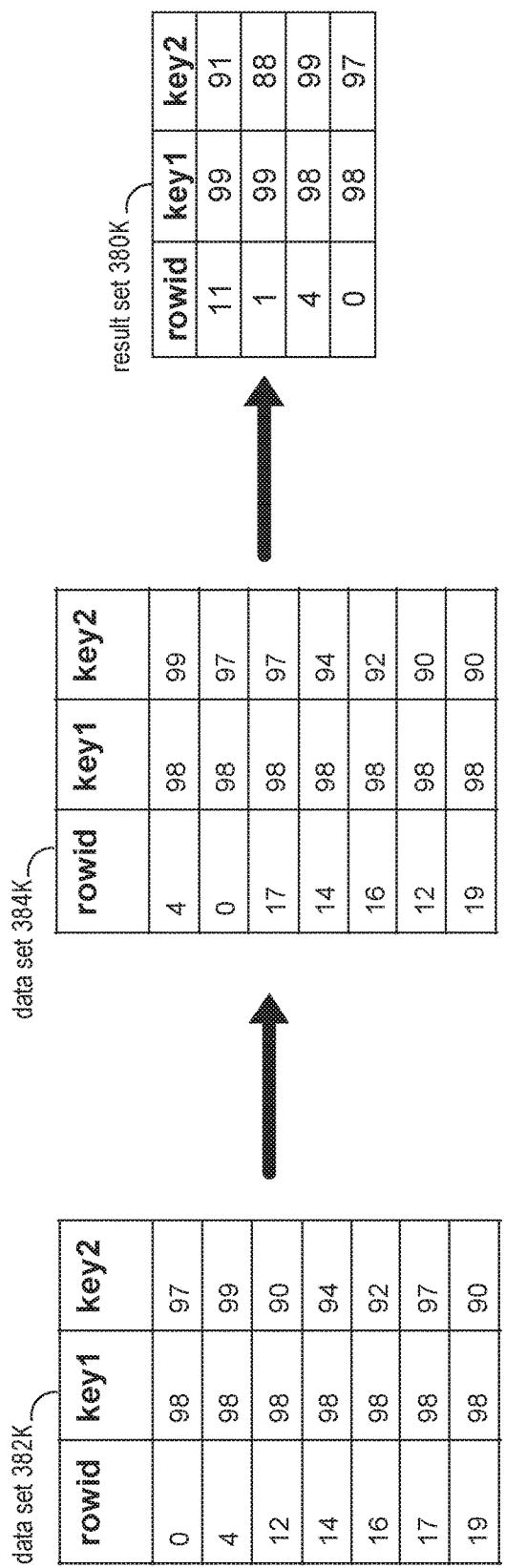

For example, FIG. 3K is a block diagram that depicts data sets of retrieved rows from tile 310 based on previous tail data structure 330G, in an embodiment. Data set 382K represents the retrieved rows from tile 310 as referenced by tail 330G in FIG. 3G after the "key1" key evaluation of tile 310. Data set 384K are the same retrieved rows of data set 382K but after sorting the rows according to the "key2" key in descending order as specified in example query Q1. After, the sorting of the rows according to the "key2" key, DBMS 100 may retrieve the first (top) two rows of data set 384K for the result set of query Q1 for tile 310 and augment the previous result set. The combined result set for this example is represented by result set 380K of FIG. 3K.

Combining Data Structures for Next Tile Evaluation

Figure 5:
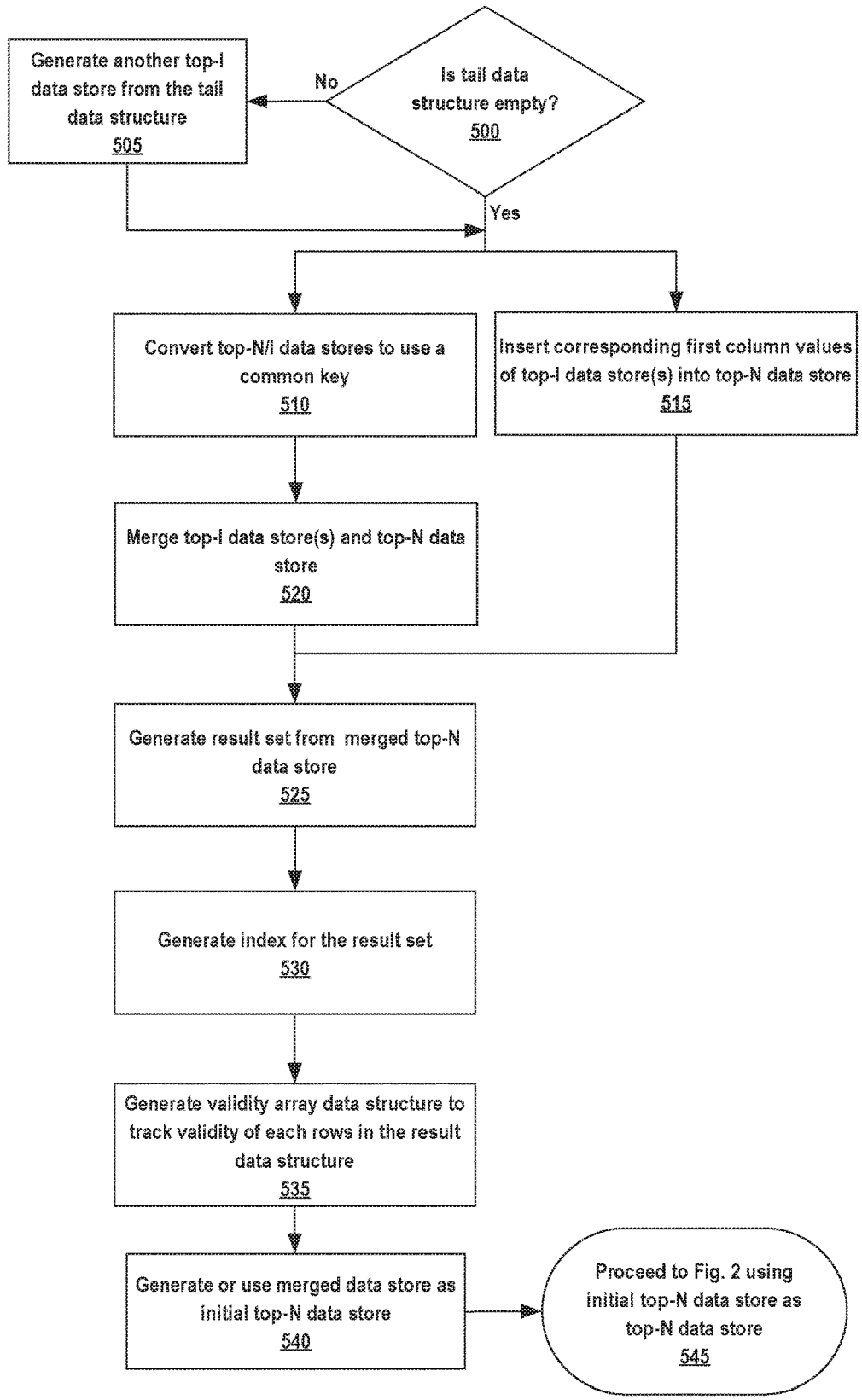
FIG. 5 is a block diagram that depicts a process for combining data structures from the previous tile evaluation to be used in evaluating the next tile, in an embodiment.

In an embodiment, after the key vectors of a tile has been evaluated for a top-N query, DBMS 100 combines the results from the evaluations to use for the evaluation of the next tile. FIG. 5 is a block diagram that depicts a process for combining data structures from the previous tile evaluation to be used in evaluating the next tile, in an embodiment.

At blocks 510-520, DBMS 100 may combine data structures from key vector evaluations of the previous tile by aggregating multiple top-N/I data stores into a single top-N data store. Since different top-N/I data stores may be based on different keys, to merge those data stores at block 520, DBMS 100 converts the data stores to use the same key, such as the first key, at block 510. If other than the first key is used, the top-N data store is converted to use the first key. Additionally or alternatively, at block 515, DBMS 100 may merge the data stores by creating a new data store or selecting one of the existing data stores and inserting the entries from the other top-N/I data stores to create the merged data store. The merged data store may be arranged based on the first key.

In an embodiment, at block 500, the last key evaluation yields a non-empty tail data structure, DBMS 100 may convert (or cast) the one or more elements from the last tail data structure into a top-I data store before performing the aggregation of the top-N/I data stores at block 505. The DBMS 100 may arbitrary select as many elements as necessary to have a total N-number of rows from the evaluations of the multiple keys as described above. The new top-I data store is also merged at blocks 510-520 as described above.

In an embodiment, in which the data stores are heap-based, to merge the heaps from the multiple key evaluations, the heaps need to be configured to use the same key. Accordingly, in one embodiment, DBMS 100 converts the heaps that are based on the subsequent keys into heaps that are based on the first key at block 510. DBMS 100 may access first key values for the non-first key-based heaps using the row identifiers specified by the non-first key-based heap and replace the heap node values with the corresponding first key values. After such a replacement of element values, DBMS 100 may re-heapify the new heap to re-arrange elements according to the heap's particular order. To yield the new merged heap representing the evaluation of the multiple keys, DBMS 100 merges the heap-based data stores at block 520.

Figure 3L:
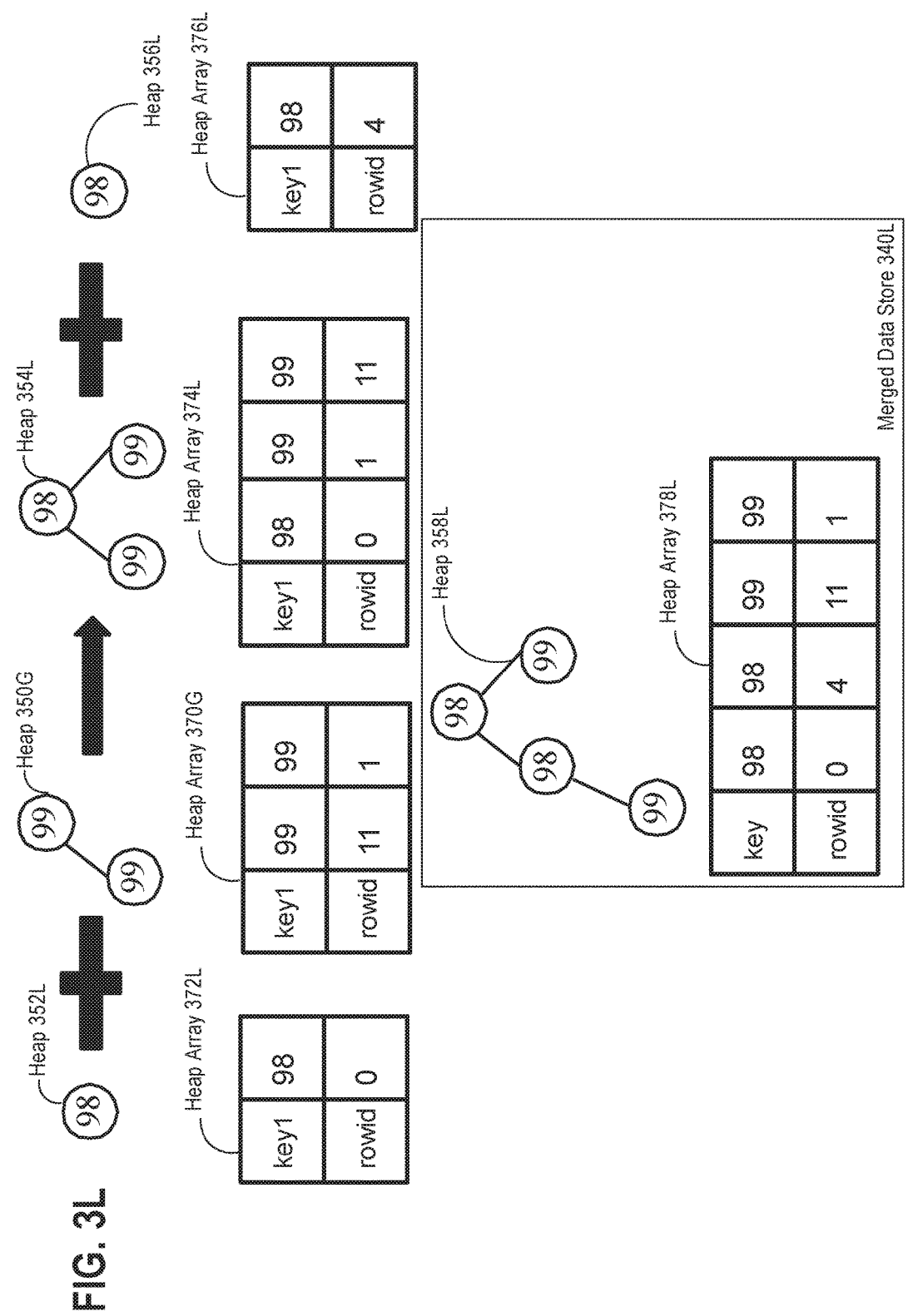

For example, FIG. 3L, is a block diagram that depicts merging of heap-based top-N/I data stores to yield a merged data store, in an embodiment. Continuing with the evaluation of query Q1 on tile 310 using data structures depicted in FIG. 3J, the arbitrary selected row 0 from the tail 332J of FIG. 3J is converted into a separate heap 352L. Both heap 352L and heap array 372L are converted to be based on the "key1" key rather than "key2" key as originating tail 332J of FIG. 3J.

Newly converted heap 352L is merged with heap 350G of FIG. 3G that resulted from "key1" key evaluation, in this example. The merging results in heap 354L and corresponding heap array 374L as depicted in FIG. 3L. The heap that resulted from the "key2" key evaluation, heap 352J, and corresponding heap array 372J of FIG. 3J are converted to be based on the "key1" key as depicted in FIG. 3L by heap 356L and corresponding heap array 376L. Converted heap 356L is merged with previously merged heap 354L to yield the final heap, 358L, and corresponding heap array, 378L, in this example. Accordingly, the merged data store 340L stores heap 358L and corresponding heap array 378L that can be used in evaluation of the next tile or to generate the result set for the evaluated tile.

At block 525, DBMS 100 may generate a result set based on the previous tile evaluation using the row identifiers specified in the merged data store of top-N/I data stores of the previous tile evaluation. The result set may contain key values for the row identifiers as well as other columns referenced by the received top-N query. Alternatively, DBMS 100 may generate the result set for the tile evaluation during each key evaluation. Result set 380J of FIG. 3J is an example of such a result set.

Preparing Next Tile Evaluation

Continuing with FIG. 5, regardless of the approach used to generate the result set for the previous tile, at block 530, DBMS 100 generates an index to differentiate the rows that have been generated from the previous tile evaluation from the rows to be identified in the next tile evaluation, in an embodiment. To index, DBMS 100 may assign sequential identifiers to each row in the result set such that the sequential identifier can be readily differentiated from the row identifiers of the next tile. In one embodiment, DBMS 100 uses an offset in the size of the number of rows in each tile for the index and increments the index for each row identifier referenced in the result set.

Figure 3M:
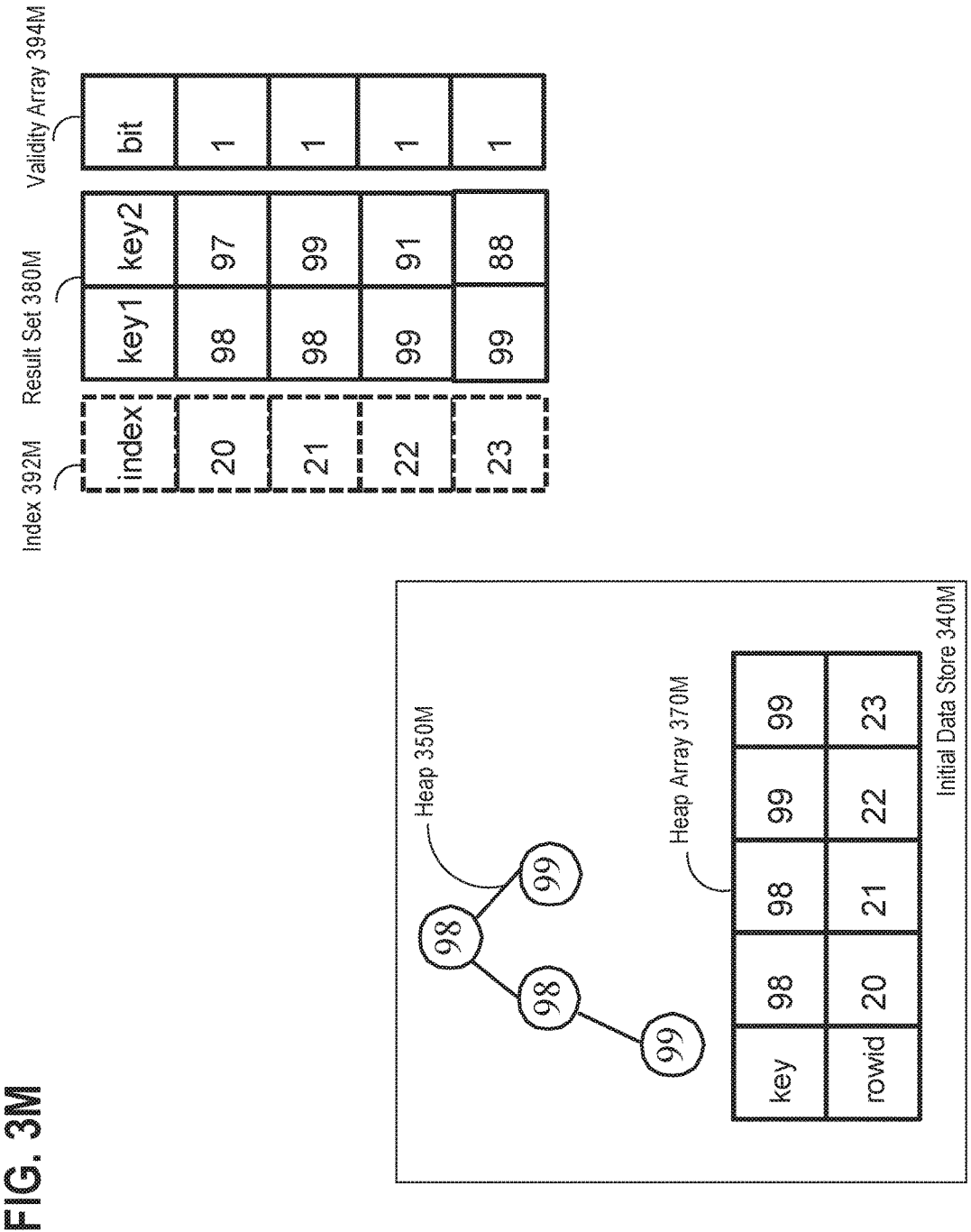

FIG. 3M is a block diagram that represents data structures for the next tile evaluation, in one or more embodiments. For example, DBMS 100 may generate index 392M for the result set 380M of tile 310. Since tile 310 has 20 rows, the index uses the value of 20 as an offset. Alternatively or additionally, DBMS 100 may use the index for the row identifiers in the merged data store as depicted in heap array 370M.

To track the validity of the result set from the previous tile evaluation during the next tile evaluation, DBMS 100 generates a data structure to store the validity of each rows in the result set at block 535, in an embodiment. The term "validity array" refers to such a data structure that may be part of the result set or be maintained separately from the result set, entries of which represent whether the corresponding row in the result set is currently a valid result for the received top-N query. Accordingly, each entry of the validity array has an explicit or implicit reference to the corresponding row in the result set for which the validity status is maintained. The validity statuses in the validity array are initialized to valid to denote that after the previous tile evaluation all the rows in the result set are valid. For example, in FIG. 3M, validity array 394M maintains the validity of each row in result set 380M. Each entry of the array has either a set bit (1) representing the row is a valid result for the top-N query or a cleared bit (0) representing the row is an invalid result for the top-N query.

In one or more embodiments in which a merged data store has not been generated from the previous tile evaluation, DBMS 100 generates an initial top-N data store for the next tile evaluation from the result set of the previous evaluation at block 540. For example, if the top-N data store is a heap based data structure, DBMS 100 generates a heap based on the first key values of each row in the result set. Additionally, DBMS 100 may use the result set index as the row identifiers (referencing the result set) in the heap array of the heap-based initial data store. In other embodiment(s) in which a merged data store has been generated, the merged data store is converted to an initial top-N data store by replacing the row identifiers of the previous tile with the indices of the result set from the previous tile evaluation. Initial data store 340M is an example of an initial data store that may be generated by DBMS 100. Initial data store 340M may include heap 350M having first key values of the result set of tile 310 and heap array 370M referencing the corresponding indices into the result set rather than the rows of the previous tile 310.

Next Tile Evaluation

In an embodiment, the next tile is evaluated using a top-N data store initialized with the result set from the previous tile evaluation. Continuing with FIG. 5 at block 545, the process proceeds to blocks described in FIG. 2 to evaluate the next tile using the previously initialized top-N data store. Each key value in the next tile may be evaluated as described above for FIG. 2.

In an embodiment, when at block 240, DBMS 100 determines that the old tail value of the top-N/I data store is to be removed and the new key value is to be added, the result set from the previous tile evaluation may need to be updated. To determine whether the removed tail value is from the previous tile result set, the row identifier of the removed tail value may be inspected at block 246. If the row identifier is determined to be referencing the previous tile result set rather than a row in the current tile, then at block 248 the referenced result in the result set is invalidated. For example, if the row identifier is greater or equal to the offset value (such as the number of rows selected for a tile), then the row identifier is an index to the result set from the previous tile evaluation.

Conversely, if the new key value of block 240 corresponds to an entry in the previous tile evaluation result, the entry is validated in the result set at block 244, in an embodiment. For example, a previous tile result set entry may have been first invalidated during a previous key evaluation but yet determined to be equal to the new tail value and thus, placed in the tail data structure. When values referenced in this tail data structure are evaluated for the next key, this same result set entry may be again determined to be part of the result set reversing the previous determination. If such a reversal occurs on the next key evaluation, then the previously invalidated result set entry (referenced in the previous tail data structure) is re-validated in the result set An entry in the result set of the previous tile evaluation may be validated or invalidated using a number of approaches. In one embodiment, to invalidate the referenced entry in the result set of the previous tile evaluation, the validity bit corresponding to the referenced entry is cleared and when validated the validity bit is set back. In another embodiment, the referenced entry may be deleted from the result set. In such an embodiment, the entry would need to be regenerated if the removed entry is later determined to be part of the top-N result set for the received query.

Figure 3N:
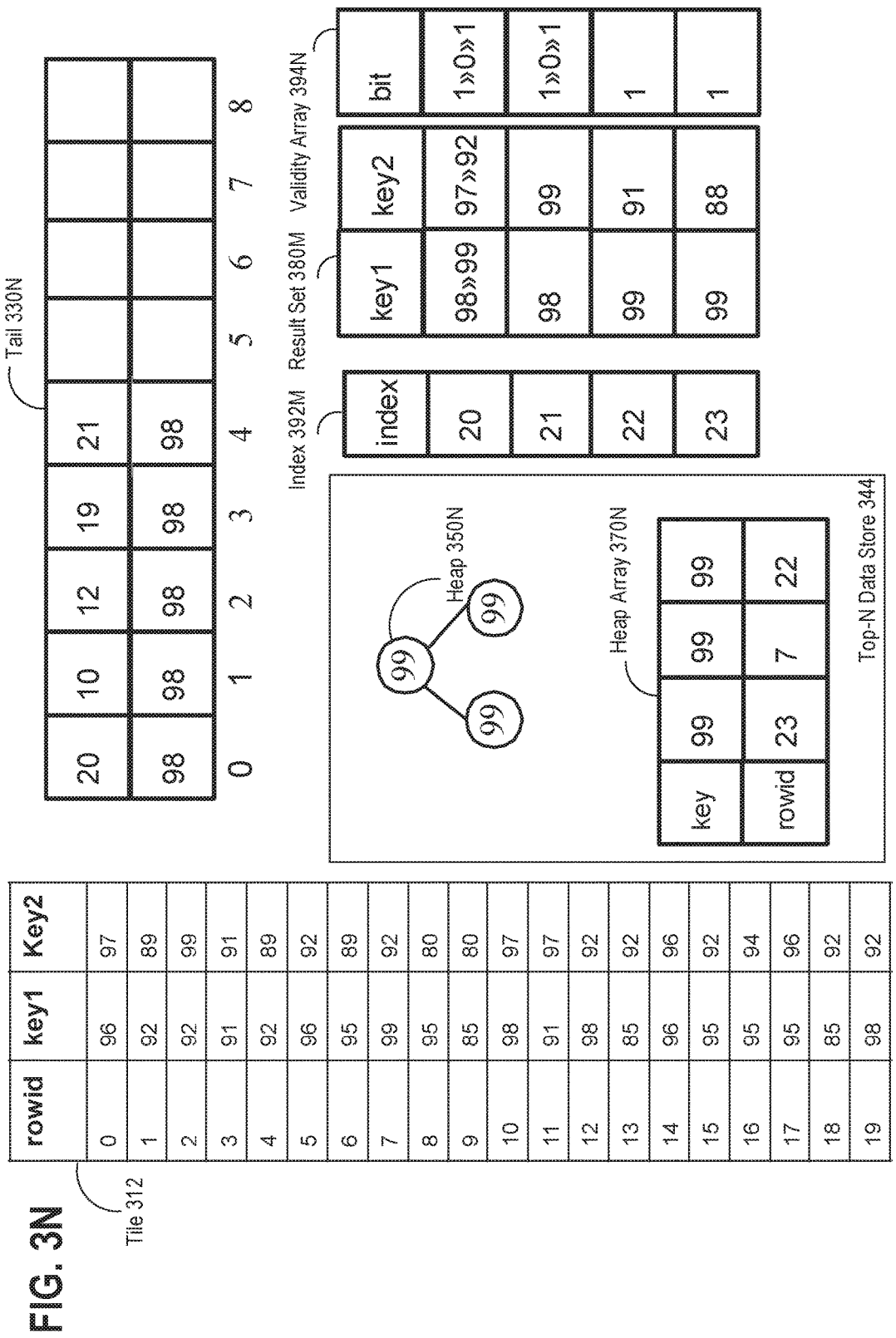

FIG. 3N is a block diagram that depicts an example of the next tile of the target data source of example query Q1 and data structures for processing the tile, in an embodiment.

When evaluating tile 312 of FIG. 3N using initial top-N data store 340M of FIG. 3M, number of entries in result set 380M are invalidated. For example, when the row with "rowid" 7 of tile 312 is evaluated based on the "key1" key, the "key1" key value of the row, "99", is greater than the root of heap 350N. Accordingly, the validity bit for the old root element in validity array 394N corresponding to index 20 is cleared in validity array 394N, and the entries for the value removed from heaps 350N and corresponding heap array 370N.

Additionally, an entry of the result set from a previous tile evaluation may be invalidated when the values from the data store are grouped into the corresponding tail data structure. Since such values may potentially be discarded as not being part of the final top-N result set with the next key evaluation (or due to not being arbitrary selected). Accordingly, the corresponding validity bits for those key values are cleared in the result set of the previous tile. Conversely, when due to the next key evaluation, the previously invalidated entry referenced in the previous tail data structure is re-selected to be part of the top-N result set, the corresponding entry in the result set is re-validated by setting back the validity bit.

For example, continuing with FIG. 3N, when the grouping of tail 330N occurs for tail value of "98" for the "key1" key, the result set 380M entry at index 21 is also moved to tail 330N. Accordingly, the validity bit in validity array 394M corresponding to index 21 is cleared (as depicted in validity array 394N in FIG. 3N). Since top-N data store 344 contains only three values out of the top-4 values requested by query Q1 in this example, the next key, the "key2" key of tile 312, is evaluated based on the rows referenced in (previous) tail 330N, and at least one value in tail 330N is found to be part of the top-4 results. During such an evaluation, the "key2" value of "99" at index 21 is the greatest in the "key2" values referenced by tail 330N. As such the entry at index 21 of the result set from the previous tile is selected for the top-4 result, and the entry in result set 380M is re-validated by setting the corresponding validity bit back to 1 in validity array 394N.

In an embodiment, the new tile evaluation may have identified rows in the new tile as a result for the result set of the received top-N query. To add these new one or more result rows from the new tile evaluation to the result set, DBMS 100 may select the invalidated entries in the result set that were invalidated by the new tile evaluation and replace them with the newly identified rows. In one embodiment, DBMS 100 may select entries in the result set that have their corresponding bit cleared in the validity array and replace these entries with the information from the new rows. Doing so, rather than deleting the invalidated entries and inserting the new result rows saves DBMS 100 on I/O operations and thus, improves the execution speed as well as computing resource consumption for the execution of the received top-N query.

For example, continuing with FIG. 3N example, after the new tile 312 evaluation, top-N data store 344 references the row 7 value of "99" which is from new tile 312 and thus, is not part of result set 380M unlike other entries of top-N data store 344. To add this new row information to result set 380M, DBMS 100 identifies the entry at index 20 that has been invalidated due to the tile 312 evaluation and replaces this entry with the new result row 7 information re-validating the entry at index 20 by setting the corresponding validity bit in validity array 394N. The new result set 380M may similarly be used in the next tile evaluation.

After the evaluation of each tile of the target data source of the received top-N query, the final result set references (or contains the information of) rows that are the result for the top-N query. Those rows may be sorted according to the keys and order specified by the top-N query and returned as the result of the top-N query.

Database Management Systems

A database management system (DBMS), such as DBMS 100, manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

In an embodiment, a DBMS may be connected to or include a cluster of nodes that may store one or more tables. The DBMS may manage tables stored on the cluster of nodes similar to managing tables stored on persistent storage.

Users interact with a database server of a DBMS by submitting to the database server commands that cause the database server to perform operations on data stored in a database. A user may be one or more applications running on a client computer that interact with a database server. Multiple users may also be referred to herein collectively as a user.

As used herein, "query" refers to a database command and may be in the form of a database statement that conforms to a database language. In one embodiment, a database language for expressing the query is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database. Although the embodiments of the invention are described herein using the term "SQL", the invention is not limited to just this particular database query language, and may be used in conjunction with other database query languages and constructs.

A client may issue a series of requests, such as requests for execution of queries, to a database server by establishing a database session, referred herein as "session." A session comprises a particular connection established for a client to a database server, such as a database instance, through which the client may issues the series of requests. The database server may maintain session state data about the session. The session state data reflects the current state of the session and may contain the identity of the user for which the session is established, services used by the user, instances of object types, language and character set data, statistics about resource usage for the session, temporary variable values generated by processes executing software within the session, and storage for cursors and variables and other information. The session state data may also contain execution plan parameters configured for the session.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
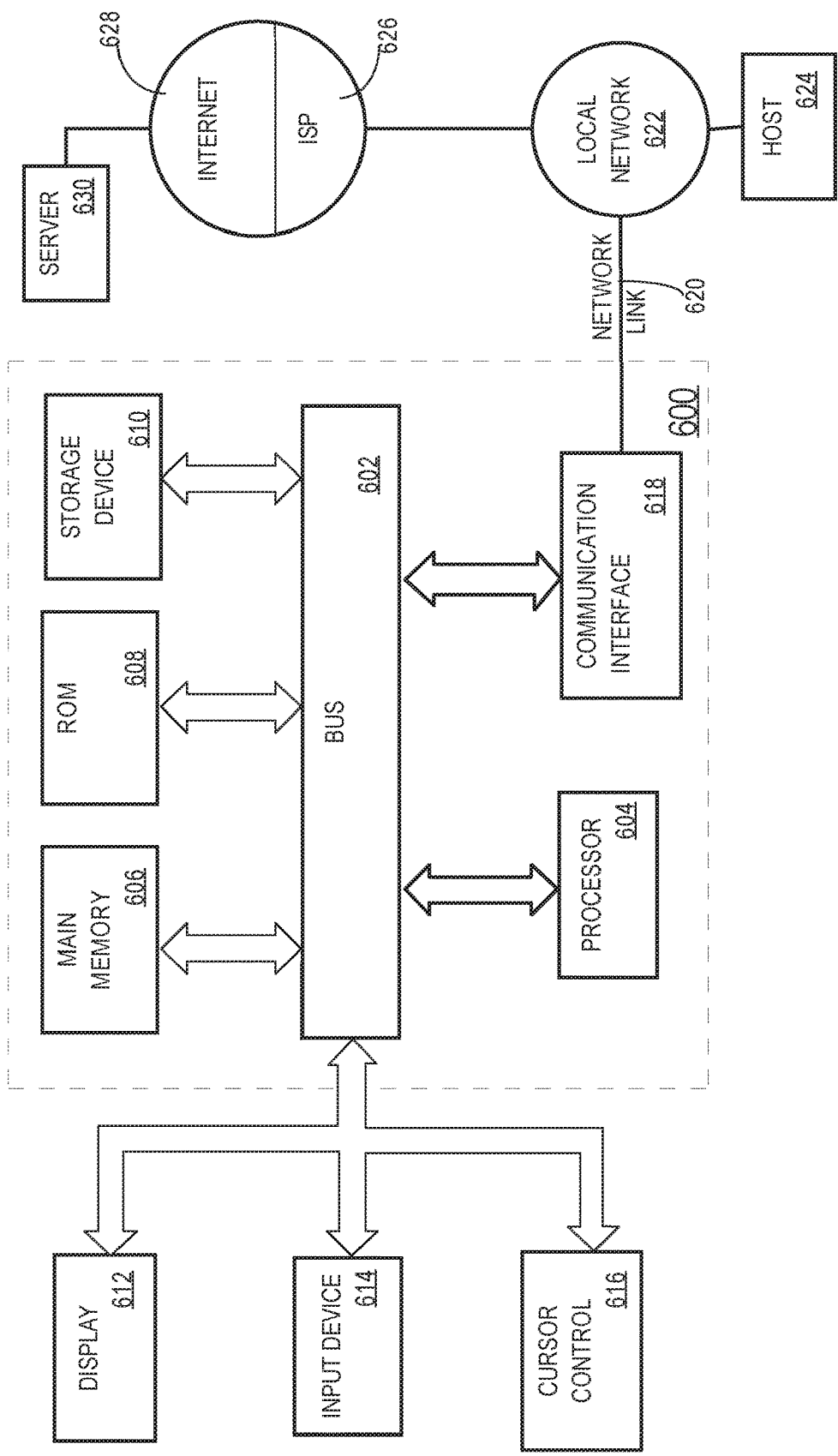
FIG. 6 is a block diagram that illustrates a computer system upon which an embodiment of the approach may be implemented.

For example, FIG. 6 is a block diagram that illustrates a computer system 600 upon which an embodiment of the approach may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Cloud Computing Overview

The techniques described herein are implemented using one or more processing solutions, examples of which include distributed systems, clustered computing systems, and cloud computing systems. In an embodiment, a DBMS and/or a cluster of nodes may be part of a cloud computing system. A cloud computing system implements one or more of: cloud storage, cloud processing, cloud communication, and any other kind of cloud computing service. Further, cloud computing systems may operate under a pay-for-what-you-use-as-you-use-it model, under a fixed subscription model, etc. In this embodiment, any part (or the whole of) the functionality attributed to the DBMS and the cluster of nodes, or to other entities within this description, is controllable via an interface that is exposed at a cloud computing system.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
executing a query with a top-N clause to select an N-number of first rows in a data source arranged at least according to a first key and a second key of the data source using a first sort order respectively specified for the first key and a second sort order respectively specified for the second key by the query, the data source comprising one or more tiles that include at least a portion of the first key and at least a portion of the second key, the executing comprising:
determining, in a first vector of first key values that are in a first tile, a particular plurality of first row identifiers identifying entries of the first vector that contain values equal to a tail value that follows a particular top number of first key values;
selecting, from a second vector of values of the second key in the first tile, a plurality of second key values identified based on the particular plurality of first row identifiers;
generating a result set of the query, wherein the result set includes at least one value from the plurality of second key values selected from the second vector based on the particular plurality of first row identifiers.

2. The method of claim 1, further comprising:
comparing a value at a particular entry of the first vector with a current tail value of the particular top number of first key values;
based on comparing, storing at least a row identifier, for the value at the particular entry, with row identifiers of the particular top number of first key values.

3. The method of claim 1, further comprising:
comparing a value at a particular entry of the first vector with a current tail value of the particular top number of first key values;
based on comparing, determining that the value at the particular entry is equal to the current tail value of the particular top number of first key values;
storing at least a row identifier of the particular entry of the first vector in a first tail data structure separate from the particular top number of first key values.

4. The method of claim 1, further comprising:
storing, in a first data structure, the particular top number of first key values and as many first key values equal to a current tail value as not to exceed the N-number of values in the first data structure;
comparing a value at a particular entry of the first vector with the current tail value;
based on comparing, determining that the value at the particular entry is equal to the current tail value of the particular top number of first key values;
determining that the first data structure stores a number of first key values equal or greater than the N-number;
based on determining that the first data structure stores a number of first key values equal or greater than the N-number, storing at least a row identifier of the particular entry of the first vector in a first tail data structure.

5. The method of claim 1, further comprising:
determining a top K-number of second key values from the second vector based on the particular plurality of first row identifiers;
wherein the top K-number is the difference between the N-number and the particular top number.

6. The method of claim 5, further comprising:
comparing values of each second entry of a plurality of entries of the second vector identified by the particular plurality of first row identifiers;
based on the comparing, determining at least one first row identifier of the particular plurality of first row identifiers that identifies corresponding said at least one value from the plurality of second key values selected from the second vector.

7. The method of claim 1, wherein the particular top number of first key values are stored in a heap data structure and the tail value is a root element.

8. The method of claim 7, further comprising:
determining the particular top number of first key values by comparing a value at each entry of the first vector with the root element of the heap data structure.

9. The method of claim 7, wherein the specified sort order for the first key is a decreasing order and the heap data structure is a minimum heap data structure, the method further comprising:
determining the particular top number of first key values by comparing a value at each entry of the first vector with the root element of the heap data structure;
if the value at said each entry is lesser than the root element, proceeding to evaluate a next entry of the first vector;
if the value at said each entry is greater than the root element:
storing the value at said each entry into the heap data structure,
removing the root element from the heap data structure, and
determining a new root element of the heap data structure,
when the new root element is equal to the root element, designating the root element as the tail value of the particular top number of first key values and storing the root element in a first tail data structure; and
if the value at said each entry is equal to the root element, storing the value at said each entry in the first tail data structure.

10. The method of claim 7, wherein the specified sort order for the first key is an increasing order and the heap data structure is a maximum heap data structure, the method further comprising:
determining the particular top number of first key values by comparing a value at each entry of the first vector with the root element of the heap data structure;
if the value at said each entry is greater than the root element, proceeding to evaluate a next entry of the first vector;
if the value at said each entry is lesser than the root element:
storing the value at said each entry into the heap data structure,
removing the root element from the heap data structure, and
determining a new root element of the heap data structure,
when the new root element is equal to the root element, designating the root element as the tail value of the particular top number of first key values and storing the root element in a first tail data structure; and if the value at said each entry is equal to the root element, storing the value at said each entry in the first tail data structure.

11. The method of claim 1, wherein row identifiers for corresponding entries of the first vector and the second vector identify a same row in the data source.

12. The method of claim 1, further comprising:
loading the first tile of the data source comprising the first vector of the first key and the second vector of the second key;
after generating the result set, loading the second tile of the data source comprising a third vector of the first key and a fourth vector of the second key;
maintaining a validity array, wherein each entry in the validity array corresponds to an entry in the result set and represents whether said entry in the result set is valid or invalid as a result of processing values in the third vector and the fourth vector.

13. The method of claim 1, further comprising:
loading the first tile of the data source comprising the first vector of the first key and the second vector of the second key;
after generating the result set, loading a second tile of the data source comprising a third vector of the first key and a fourth vector of the second key;
maintaining a validity array, wherein each entry in the validity array corresponds to an entry in the result set and represents whether said entry in the result set is valid or invalid as a result of processing values in the third vector and the fourth vector;
based on processing values of the third vector, determining that a particular result entry in the result set is no longer in the particular top number of first key values;
updating a particular validity entry in the validity array corresponding to the particular result entry in the result set to represent that the particular result entry in the result set is invalid.

14. The method of claim 1, further comprising:
loading the first tile of the data source comprising the first vector of the first key and the second vector of the second key;
after generating the result set, loading a second tile of the data source comprising a third vector of the first key and a fourth vector of the second key;
determining, in the third vector of the first key in the second tile, a particular plurality of third row identifiers identifying entries that contain values equal to a third tail value that follows a particular top number of third key values;
wherein the particular top number of third key values are initially assigned from first key values of the result set;
selecting, from the fourth vector of the second key in the second tile, a plurality of fourth key values identified based on the particular plurality of third row identifiers;
updating the result set of the query, wherein the result set includes at least a value from the plurality of fourth key values selected from the fourth vector based on the particular plurality of third row identifiers.

15. One or more non-transitory computer-readable media storing a set of instructions, wherein the set of instructions includes instructions, which when executed by one or more hardware processors, cause:
executing a query with a top-N clause to select an N-number of first rows in a data source arranged at least according to a first key and a second key of the data source using a first sort order respectively specified for the first key and a second sort order respectively specified for the second key by the query, the data source comprising of one or more tiles that include at least a portion of the first key and at least a portion of the second key, the executing comprising:
determining, in a first vector of first key values that are in a first tile, a particular plurality of first row identifiers identifying entries of the first vector that contain values equal to a tail value that follows a particular top number of first key values;
selecting, from a second vector of values of the second key in the first tile, a plurality of second key values identified based on the particular plurality of first row identifiers;
generating a result set of the query, wherein the result set includes at least one value from the plurality of second key values selected from the second vector based on the particular plurality of first row identifiers.

16. The one or more non-transitory computer-readable media of claim 15, wherein the set of instructions further includes instructions, which when executed by said one or more hardware processors, cause:
comparing a value at a particular entry of the first vector with a current tail value of the particular top number of first key values;
based on comparing, storing at least a row identifier, for the value at the particular entry, with row identifiers of the particular top number of first key values.

17. The one or more non-transitory computer-readable media of claim 15, wherein the set of instructions further includes instructions, which when executed by said one or more hardware processors, cause:
comparing a value at a particular entry of the first vector with a current tail value of the particular top number of first key values;
based on comparing, determining that the value at the particular entry is equal to the current tail value of the particular top number of first key values;
storing at least the row identifier of the particular entry of the first vector in a first tail data structure separate from the particular top number of first key values.

18. The one or more non-transitory computer-readable media of claim 15, wherein the set of instructions further includes instructions, which when executed by said one or more hardware processors, cause:
storing, in a first data structure, the particular top number of first key values and as many first key values equal to a current tail value as not to exceed the N-number of values in the first data structure;
comparing a value at a particular entry of the first vector with the current tail value;
based on comparing, determining that the value at the particular entry is equal to the current tail value of the particular top number of first key values;
determining that the first data structure stores a number of first key values equal or greater than the N-number;
based on determining that the first data structure stores a number of first key values equal or greater than the N-number, storing at least the row identifier of the particular entry of the first vector in a first tail data structure.

19. The one or more non-transitory computer-readable media of claim 15, wherein the set of instructions further includes instructions, which when executed by said one or more hardware processors, cause:

determining a top K-number of second key values from the second vector based on the particular plurality of first row identifiers;
wherein the top K-number is the difference between the N-number and the particular top number.

20. The one or more non-transitory computer-readable media of claim 19, wherein the set of instructions further includes instructions, which when executed by said one or more hardware processors, cause:
comparing values of each second entry of a plurality of entries of the second vector identified by the particular plurality of first row identifiers;
based on the comparing, determining at least one first row identifier of the particular plurality of first row identifiers that identifies corresponding said at least one value from the plurality of second key values selected from the second vector.

21. The one or more non-transitory computer-readable media of claim 15, wherein the particular top number of first key values are stored in a heap data structure and the tail value is a root element, and wherein the instructions further includes instructions, which when executed by said one or more hardware processors, cause determining the particular top number of first key values by comparing a value at each entry of the first vector with the root element of the heap data structure.

22. The one or more non-transitory computer-readable media of claim 15, wherein row identifiers for corresponding entries of the first vector and the second vector identify a same row in the data source.

23. The one or more non-transitory computer-readable media of claim 15, wherein the set of instructions further includes instructions, which when executed by said one or more hardware processors, cause:
loading the first tile of the data source comprising of the first vector of the first key and the second vector of the second key;
after generating the result set, loading the second tile of the data source comprising a third vector of the first key and a fourth vector of the second key;
maintaining a validity array, wherein each entry in the validity array corresponds to an entry in the result set and represents whether said entry in the result set is valid or invalid as a result of processing values in the third vector and the fourth vector.

24. The one or more non-transitory computer-readable media of claim 15, wherein the set of instructions further includes instructions, which when executed by said one or more hardware processors, cause:
loading the first tile of the data source comprising of the first vector of the first key and the second vector of the second key;
after generating the result set, loading a second tile of the data source comprising a third vector of the first key and a fourth vector of the second key;
maintaining a validity array, wherein each entry in the validity array corresponds to an entry in the result set and represents whether said entry in the result set is valid or invalid as a result of processing values in the third vector and the fourth vector;
based on processing values of the third vector, determining that a particular result entry in the result set is no longer in the particular top number of first key values;
updating a particular validity entry in the validity array corresponding to the particular result entry in the result set to represent that the particular result entry in the result set is invalid.

25. The one or more non-transitory computer-readable media of claim 15, wherein the set of instructions further includes instructions, which when executed by said one or more hardware processors, cause:
loading the first tile of the data source comprising of the first vector of the first key and the second vector of the second key;
after generating the result set, loading a second tile of the data source comprising a third vector of the first key and a fourth vector of the second key;
determining, in the third vector of the first key in the second tile, a particular plurality of third row identifiers identifying entries that contain values equal to a third tail value that follows a particular top number of third key values;
wherein the particular top number of third key values are initially assigned from first key values of the result set;
selecting, from the fourth vector of the second key in the second tile, a plurality of fourth key values identified based on the particular plurality of third row identifiers;
updating the result set of the query, wherein the result set includes at least a value from the plurality of fourth key values selected from the fourth vector based on the particular plurality of third row identifiers.

* * * * *

UNITED STATES PATENT AND TRADEMARK OFFICE
CERTIFICATE OF CORRECTION

PATENT NO. : 10,394,811 B2
APPLICATION NO. : 15/608830
DATED : August 27, 2019
INVENTOR(S) : Zhang et al.

Page 1 of 1

It is certified that error appears in the above-identified patent and that said Letters Patent is hereby corrected as shown below:

On the Title Page

Column 2, item (56) under Other Publications, Line 2, delete "Ditributed" and insert -- Distributed --, therefor.

In the Specification

In Column 17, Line 54, after "set" insert -- . --.

Signed and Sealed this
Twenty-fifth Day of August, 2020

Andrei Iancu
*Director of the United States Patent and Trademark Office*